US009238204B2

(12) United States Patent
Sano et al.

(10) Patent No.: US 9,238,204 B2
(45) Date of Patent: Jan. 19, 2016

(54) GAS SEPARATION COMPOSITE MEMBRANE AND GAS SEPARATING MODULE, GAS SEPARATION APPARATUS AND GAS SEPARATION METHOD USING THE SAME

(71) Applicant: FUJIFILM Corporation, Minato-ku, Tokyo (JP)

(72) Inventors: Satoshi Sano, Ashigarakami-gun (JP); Tomonori Ishino, Ashigarakami-gun (JP); Ichirou Nagata, Ashigarakami-gun (JP); Kentaro Shiratsuchi, Ashigarakami-gun (JP); Shigehide Itou, Ashigarakami-gun (JP); Kenichi Ishizuka, Ashigarakami-gun (JP); Takeshi Umehara, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 72 days.

(21) Appl. No.: 14/158,074

(22) Filed: Jan. 17, 2014

(65) Prior Publication Data

US 2014/0130668 A1 May 15, 2014

Related U.S. Application Data

(63) Continuation of application No. PCT/JP2012/068887, filed on Jul. 25, 2012.

(30) Foreign Application Priority Data

Jul. 28, 2011 (JP) ................................ 2011-165889

(51) Int. Cl.
*B01D 71/64* (2006.01)
*B01D 53/22* (2006.01)
(Continued)

(52) U.S. Cl.
CPC .............. *B01D 71/64* (2013.01); *B01D 53/228* (2013.01); *B01D 67/0006* (2013.01); *C08G 73/1039* (2013.01); *B01D 2323/30* (2013.01); *B01D 2323/34* (2013.01); *Y02C 20/20* (2013.01)

(58) Field of Classification Search
CPC .. B01D 53/228; B01D 67/0006; B01D 71/64; B01D 2257/504; B01D 2323/30; B01D 2323/34; C08G 73/1039
USPC .................................. 96/4, 11, 13, 14; 95/51
See application file for complete search history.

(56) References Cited

U.S. PATENT DOCUMENTS 5,286,280 A 2/1994 Chiou
5,928,410 A * 7/1999 Jois et al. ......................... 95/51
(Continued)

FOREIGN PATENT DOCUMENTS

JP 55-162308 A 12/1980
JP 58-5344 * 1/1983 ............ B01D 53/22
(Continued)

OTHER PUBLICATIONS

Chung, Tai-Shung et al., "PAMAM Dendrimer-Induced Cross-Linking Modification of Polyimide Membranes", Langmuir, 2004, vol. 20, pp. 2966-2969.*
(Continued)

*Primary Examiner* — Jason M Greene
(74) *Attorney, Agent, or Firm* — Sughrue Mion, PLLC

(57) ABSTRACT

A gas separation composite membrane, containing a gas-permeable supporting layer and a gas separating layer containing a crosslinked polyimide resin over the gas-permeable supporting layer, in which the crosslinked polyimide resin has structure in which a polyimide compound is crosslinked through a specific crosslinking chain, the specific crosslinking chain has at least one kind of linking group selected from the group consisting of $-NR^aC(=O)-$, $-NR^bC(=O)O-$, $-CH_2OCH_2-$, $-CH_2SCH_2-$, $-OC(=O)O-$, $-C(=O)O^-N^+(R^c)_3-$, $-SO_3^-N^+(R^d)_3-$ and $-PO_3^-N^+(R^e)_3-$, and $R^a$, $R^b$, $R^c$, $R^d$ and $R^e$ each independently represent a hydrogen atom or a substituent.

22 Claims, 1 Drawing Sheet

(51) Int. Cl.
*C08G 73/10* (2006.01)
*B01D 67/00* (2006.01)

(56) References Cited

U.S. PATENT DOCUMENTS

| | | | | |
|---|---|---|---|---|
| 7,247,191 | B2 | 7/2007 | Koros et al. | |
| 8,545,606 | B2 * | 10/2013 | Koros et al. | 95/51 |
| 2003/0070545 | A1 * | 4/2003 | Liu et al. | 95/45 |
| 2003/0131731 | A1 * | 7/2003 | Koros et al. | 96/10 |
| 2004/0177753 | A1 * | 9/2004 | Chung et al. | 96/14 |
| 2005/0268783 | A1 | 12/2005 | Koros et al. | |
| 2006/0135732 | A1 * | 6/2006 | Yeager | 528/170 |
| 2008/0035572 | A1 * | 2/2008 | Sabottke et al. | 210/651 |
| 2008/0044681 | A1 * | 2/2008 | Yamaguchi et al. | 428/626 |
| 2009/0178561 | A1 | 7/2009 | Miller et al. | |
| 2010/0270234 | A1 | 10/2010 | Liu et al. | |
| 2011/0192281 | A1 * | 8/2011 | Hosseini et al. | 96/10 |
| 2011/0269915 | A1 * | 11/2011 | Koros et al. | 525/420 |
| 2014/0137734 | A1 * | 5/2014 | Liu et al. | 95/51 |
| 2015/0000519 | A1 * | 1/2015 | Liu et al. | 95/45 |

FOREIGN PATENT DOCUMENTS

| | | | |
|---|---|---|---|
| JP | 58-5344 | A | 1/1983 |
| JP | 58-14908 | A | 1/1983 |
| JP | 63-185405 | A | 8/1988 |
| JP | 63-240901 | A | 10/1988 |
| JP | 6-269650 | A | 9/1994 |
| JP | 9-103663 | A | 4/1997 |
| JP | 2004277743 | A | 10/2004 |
| JP | 2006-297335 | A | 11/2006 |
| JP | 2007-297605 | A | 11/2007 |
| JP | 2011-509819 | A | 3/2011 |

OTHER PUBLICATIONS

Communication dated Sep. 2, 2014, issued by the Japanese Patent Office in counterpart Application No. 2012164022.
Liu, Ye et al.,"Chemical Cross-linking modification of polyimide membranes for gas separation", Journal of Membrane Science, 189, (2001), pp. 231-239.
Yuri Yampolskii et al., "Membrane Gas Separation", 2010, Johns Wiley & Sons Ltd., 4 pgs.
Richard W. Baker et al., "Natural Gas Processing With Membranes: An Overview", Ind. Eng. Chem. Res., 2008, pp. 2109-2121, vol. 47.
Richard W. Baker, "Future Directions of Membrane Gas Separation Technology", Ind. Eng. Chem. Res. 2002, pp. 1393-1411, vol. 41.
Claudia Staudt-Bickel et al., "Improvement of $CO_2/CH_4$ separation characteristics of polyimides by chemical crosslinking", Journal of Membrane Science 1999, pp. 145-154, vol. 155.
William J. Koros et al., "Pushing the limits on possibilities for large scale gas separation: which strategies?", Journal of Membrane Science 2000, pp. 181-196, vol. 175.
M. Marek et al., "Crosslinked Ultra-Thin Polyimide Film as a Gas Separation Layer for Composite Membranes", Eur. Polym. J., 1997, pp. 1717-1721, vol. 33, No. 10-12.
International Search Report for PCT/JP2012/068887 dated Sep. 25, 2012.

* cited by examiner

GAS SEPARATION COMPOSITE MEMBRANE AND GAS SEPARATING MODULE, GAS SEPARATION APPARATUS AND GAS SEPARATION METHOD USING THE SAME

TECHNICAL FIELD

The present invention relates to a gas separation composite membrane, and a gas separating module, a gas separation apparatus and a gas separation method using the same.

BACKGROUND ART

A raw material comprising a polymer compound has characteristic gas permeability for each raw material. Capability of separation of a desired gas component is known, based on properties thereof, by a membrane constituted of a specific polymer raw material. As an industrial application embodiment of this gas separation membrane, study has been conducted for separating and recovering carbon dioxide with energy saving from a large-scale carbon dioxide generation source in a thermal power station, a cement plant, a blast furnace in a steel plant or the like in relation to a global warming issue, and attracts attention as a solution to an environmental issue. Meanwhile, natural gas or bio gas (gases generated by fermentation and anaerobic digestion of excreta of organisms, organic fertilizers, biodegradable substances, polluted water, garbage's, energy crops, and the like) is mainly a mixed gas of methane and carbon dioxide. Study has been made so far for a membrane separation method as a means for removing an impurity such as carbon dioxide therein (see Patent Literature 1 and Patent Literature 2). In particular, study has been made for cellulose or polyimide as a raw material in purification of a natural gas. However, the membrane is plasticized under high pressure conditions and high carbon dioxide concentration in an actual plant, and a decrease of separation selectivity due to the plasticization has become a problem (see Non-Patent Literature 1, and Non-Patent Literatures 2 and 3). Moreover, an impurity such as a trace amount of water, hydrogen sulfide, long-chain hydrocarbon, an aromatic compound such as benzene and xylem is contained in the natural gas. Accordingly, these impurities stagnate in a separation membrane module as use is continued, and may occasionally damage a membrane raw material. From this respect also, improvement has been required for chemical stability (see Patent Literature 8).

In order to suppress plasticization of the membrane, introduction of crosslinked structure into a polymer compound constituting the membrane is known to be effective, and research has been continued for improvement in a polyimide or cellulose membrane (see Non-Patent Literature 1, and Patent Literature 4). In addition thereto, specific examples of arts utilizing a membrane having a crosslinked structure of polymide for the gas separation membrane include arts described in Patent Literature 3, and Non-Patent Literatures 4, 5 and 6.

CITATION LIST

Patent Literatures

Patent Literature 1: JP-A-2007-297605 ("JP-A" means unexamined published Japanese patent application)
Patent Literature 2: JP-A-2006-297335
Patent Literature 3: U.S. Pat. No. 7,247,191
Patent Literature 4: US 2010/0270234

Non-Patent Literatures

Non-Patent Literature 1: Yuri Yampolskii, Benny Freeman, Membrane Gas Separation, 2010, Johns Wiley & Sons Ltd.
Non-Patent Literature 2: Industrial & Engineering Chemistry Research, 2008, 47, 2109
Non-Patent Literature 3: Industrial & Engineering Chemistry Research, 2002, 41, 1393
Non-Patent Literature 4: Journal of Membrane Science, 1999, 155, 145
Non-Patent Literature 5: Journal of Membrane Science, 2000, 175, 181
Non-Patent Literature 6: European Polymer Journal, 1997, 33, 1717

SUMMARY OF THE INVENTION

Technical Problem

Incidentally, in order to constitute a practical gas separation membrane, high gas permeability should be provided by processing a raw material into a thin layer. An attempt has been made so far for processing a single raw layer into an asymmetric membrane, thereby processing a part contributing to separation into the thin layer referred to as a skin layer to satisfy high gas permeability, separation selectivity and also mechanical strength. However, the single raw material is difficult to be processed into one uniting these properties. Therefore, from viewpoints of performance and cost, a composite membrane is desirable in which separate raw materials bear a separation function and a function for providing the membrane with the mechanical strength, and the composite membrane is becoming mainstream in a reverse osmosis membrane for water treatment.

On the other hand, examples are few in which a crosslinked structure membrane of polyimide is utilized for a separating layer in the gas separation membrane (see Patent Literature 3, and Non-Patent Literatures 4, 5 and 6). According to these methods, a high temperature of 100° C. or higher or a very long time is required to crosslinking in some cases. Therefore, these methods have been still insufficient for providing a practical gas separation membrane having excellent membrane-forming competence and also high mechanical strength, and excellent durability, while maintaining high gas permeability and separation selectivity. Moreover, improvement is also desired for damage by water or an organic component contained in a natural gas or the like.

In view of the above-described respects, the present invention provides a gas separation composite membrane that has excellent gas permeability and also realizes high gas separation selectivity and further attains high membrane-forming competence and stability over time; and a module, a gas separation apparatus and a gas separation method using the same.

Solution to Problem

The problems of the present invention can be solved by the following means.

(1) A gas separation composite membrane, containing:
a gas-permeable supporting layer; and
a gas separating layer containing a crosslinked polyimide resin over the gas-permeable supporting layer,
wherein the crosslinked polyimide resin has structure in which a polyimide compound is crosslinked through a specific crosslinking chain;

wherein the specific crosslinking chain has at least one kind of linking group selected from the group consisting of —NR$^a$C(═O)—, —NR$^b$C(═O)O—, —$CH_2OCH_2$—, —$CH_2SCH_2$—, —OC(═O)O—, —C(═O)$O^-N^+(R^c)_3$—, —$SO_3^-N^+(R^d)_3$— and —$PO_3^-N^+(R^e)_3$—; and wherein $R^a$, $R^b$, $R^c$, $R^d$ and $R^e$ each independently represent a hydrogen atom or a substituent; and a plurality of $R^a$, $R^b$, $R^c$, $R^d$ and $R^e$ may be identical or different, or may be bonded or subjected to ring condensation with each other to form a ring.

(2) The gas separation composite membrane as described in the above item (1), wherein the specific crosslinking chain contains at least one kind of linking group selected from the group consisting of —C(═O)$O^-N^+(R^c)_3$— and —$SO_3^-N^+(R^d)_3$—, and —NHC(═O)—.

(3) The gas separation composite membrane as described in the above item (1) or (2), wherein the polyimide compound contains a repeating unit represented by Formula (1), at least one kind of repeating unit represented by Formula (II-a) or (II-b), and at least one kind of repeating unit represented by Formula (III-a) or (III-b):

Formula (I)

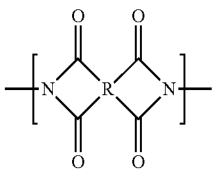

wherein R in Formula (I) is a group of atoms selected from the group consisting of the groups represented by any one of Formulas (I-a) to (I-g);

Formula (I-a)

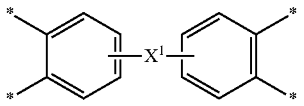

Formula (I-b)

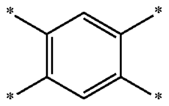

Formula (I-c)

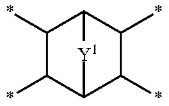

Formula (I-d)

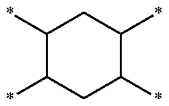

Formula (I-e)

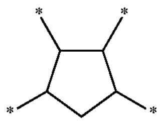

-continued

Formula (I-f)

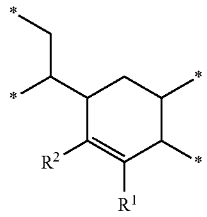

Formula (I-g)

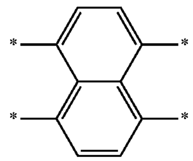

wherein, in Formulas (I-a) to (I-g), $X^1$ represents a single bond or a bivalent linking group; $Y^1$ represents a methylene group or a vinylene group; $R^1$ and $R^2$ each independently represent a hydrogen atom or a substituent, or may bond with each other to form a ring; and the symbol "*" represents a binding site with the carbonyl group of the imide in Formula (I);

Formula (II-a)

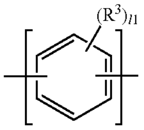

Formula (II-b)

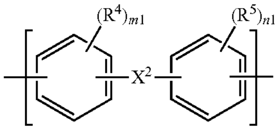

wherein $R^3$ in Formula (II-a) represents an alkyl group, a hydroxyl group, a carboxyl group, a sulfonic acid group, an amino group or a halogen atom; l1 in Formula (II-a) represents an integer of from 0 to 4; $R^4$ and $R^5$ in Formula (II-b) each independently represent an alkyl group, a hydroxyl group, a carboxyl group, a sulfonic acid group, an amino group or a halogen atom; $R^4$ and $R^5$ in Formula (II-b) may bond with each other to form a ring; m1 and n1 in Formula (II-b) each independently represent an integer of from 0 to 4; and $X^2$ in Formula (II-b) represents a single bond or a bivalent linking group; and Formula (III-a)

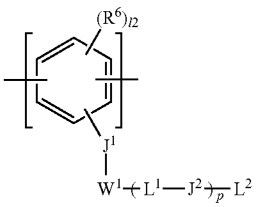

-continued

Formula (III-b)

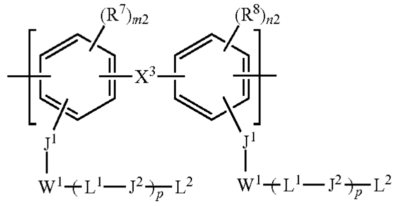

wherein, in Formulas (III-a) and (III-b), $R^6$, $R^7$ and $R^8$ each independently represent a substituent; $R^7$ and $R^8$ may bond with each other to form a ring; $J^1$ and $J^2$ each independently represent at least one kind of linking group selected from the group consisting of —$NR^aC(=O)$—, —$NR^bC(=O)O$—, —$CH_2OCH_2$—, —$CH_2SCH_2$—, —$OC(=O)O$—, —$C(=O)O^-N^+(R^c)_3$—, —$SO_3^-N^+(R^d)_3$—, and —$PO_3^-N^+(R^e)_3$—; $R^a$, $R^b$, $R^c$, $R^d$ and $R^e$ each independently represent a hydrogen atom or a substituent; $W^1$ represents a single bond or a bivalent linking group; l2, m2 and n2 each independently represent an integer of from 0 to 3; $L^1$ represents a bivalent linking group; $L^2$ represents a functional group; p represents an integer of 0 or more; when p is 2 or more, $L^1$'s and $J^2$'s may be the same or different from each other; and $X^3$ represents a single bond or a bivalent linking group.

(4) The gas separation composite membrane as described in the above item (3), wherein the functional group is at least one kind of functional group selected from the group consisting of —$NHC(=O)CR^f=CH_2$, —OH, —SH, and —$CH=CH_2$; and $R^f$ represent a hydrogen atom or an alkyl group.

(5) The gas separation composite membrane as described in the above item (3) or (4), wherein R in formula (I) is represented by formula (I-a').

Formula (I-a')

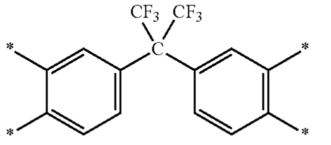

(6) The gas separation composite membrane as described in any one of the above items (3) to (5), wherein $J^1$ in formulas (III-a) and (III-b) is at least one kind of linking group selected from the group consisting of —$C(=O)O^-N^+R^c_3$—, —$SO_3^-N^+R^d_3$—, and —$PO_3^-N^+R^c_3$—.

(7) The gas separation composite membrane as described in any one of the above items (3) to (6), wherein p in formulas (III-a) and (III-b) is 0.

(8) The gas separation composite membrane as described in any one of the above items (3) to (7), wherein $L^2$ in formulas (III-a) and (III-b) is —$NHC(=O)CR^f=CH_2$, and $R^f$ represent a hydrogen atom or an alkyl group.

(9) The gas separation composite membrane as described in any one of the above items (1) to (8), wherein the supporting layer contains a porous layer on a side of the gas separating layer and a nonwoven fabric layer on a side reverse thereto.

(10) The gas separation composite membrane as described in any one of the above items (1) to (9), wherein the porous layer has a molecular weight cut-off of 100,000 or less.

(11) The gas separation composite membrane as described in any one of the above items (1) to (10), wherein a gas to be supplied is a mixed gas of at least of carbon dioxide and methane, wherein a transmission rate of the carbon dioxide at 40° C. and 8 atmospheric pressure is more than 20 GPU, and wherein a ratio of the transmission rate of the carbon dioxide to a transmission rate of the methane ($TR_{CO2}/TR_{CH4}$) is 20 or more.

(12) A gas separation module, containing the gas separation composite membrane as described in any one of the above items (1) to (11).

(13) A gas separation apparatus, containing the gas separation module as described in the above item (12).

(14) A gas separation method, which contains a step of selectively permeating carbon dioxide from a gas containing carbon dioxide and methane by using the gas separation composite membrane as described in any one of the above items (1) to (11).

When a plurality of substituents, linking groups or the like (hereinafter, referred to as "substituent or the like") represented by a specific symbol are described herein, or a plurality of substituents or the like are simultaneously or alternatively defined herein, respective substituents or the like may be identical or different. This is applied to a definition of the number of substituents or the like in a similar manner. Moreover, unless otherwise noted, when a plurality of substituents or the like are close, they may be linked with each other or subjected to ring condensation, thereby forming a ring.

Moreover, when an expression "may bond with each other to form a ring" is referred to herein, the expression may include ones that are bonded by a single bond, a double bond or the like to form cyclic structure, or ones that are subjected to ring condensation to form condensed ring structure.

In the present specification, when the name of a chemical is called by putting the term "compound" at the foot of the chemical name, or when the chemical is shown by a specific name or a chemical formula, a showing of the compound is used to mean not only the compound itself, but also a salt, a complex or ion thereof and the like. Further, the showing of the compound is also used to mean incorporation of derivatives having a predefined substituent or modified by a predefined configuration to an extent necessary to obtain a desired effect. Further, in the present specification, when a specific group of atoms or a specific compound is called by putting the term "group" at the foot of the specific group of atoms or the specific compound with respect to the substituent, the group means that the group of atoms or the compound may have further an arbitrary substituent.

Advantageous Effects of Invention

The gas separation composite membrane according to the present invention has excellent gas permeability and also realizes high gas separation selectivity and further attains high membrane-forming competence and stability over time (resistance to deterioration over time to water or the like contained gas to be separated). Moreover, the present invention allows provision of a high-performance gas separating module, gas separation apparatus and gas separation method using the same. Further, a method of producing a gas separation composite membrane according to the present invention allows production of a gas separation composite membrane that develops the above-described high performance.

Other and further features and advantages of the invention will appear more fully from the following description, appropriately referring to the accompanying drawings.

BRIEF DESCRIPTION OF THE DRAWING

FIG. 1 is a cross section schematically illustrating one embodiment of the gas separation composite membrane according to the present invention.

FIG. 2 is a cross section schematically illustrating another embodiment of the gas separation composite membrane according to the present invention.

MODE FOR CARRYING OUT THE INVENTION

Figure 1:
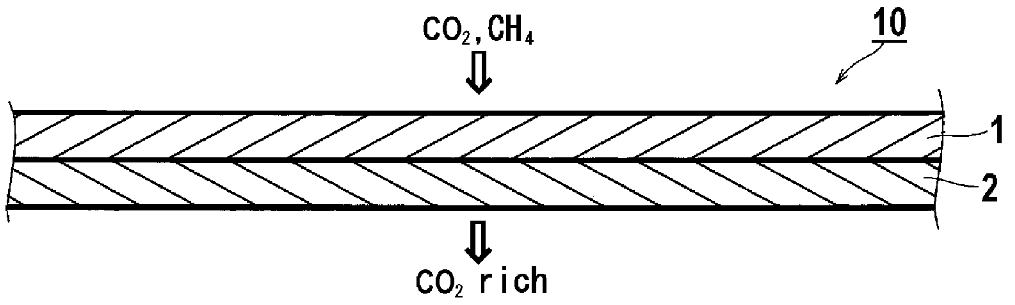
{FIG. 1}

In view of the above-described technical problems, the present inventors conducted study. As a result, the present inventors found that, in order to provide a gas separation membrane with membrane-forming competence while maintaining high gas permeability and separation selectivity, a supporting layer is utilized to form a composite membrane, and then structure having a specific crosslinking chain is formed for a crosslinked polyimide resin constituting a separating layer, and thus the above-described problems can be solved. The present invention was made based on these findings.

When a gas molecule permeates a thin film, consideration is made to a role of a Knudsen mechanism or a Hagen-Poiseuille mechanism (porous membrane), a surface diffusion mechanism (porous membrane), a molecular sieve mechanism (porous membrane), a dissolution and diffusion mechanism (nonporous membrane) or the like (see "Shintei Saishin Polyimide—Kiso to Oyo—," 365 to 376, edited by Nihon Polyimide Hokozokukei Kobunshi Kenkyukai). Here, when separation of $CO_2$ and $CH_4$ is referred to, both are a low-molecular-weight compound, and molecular sizes to be separated are approximated. In such a case, control of the above-described dissolution and diffusion mechanism becomes important (see "Kitaibunrimaku, Tokamaku, Bariamaku no Saishingijyutsu," pp. 52-59, compiled under the supervision by Kazukiyo Nagai, CMC Publishing CO., LTD.). Therefore, in order to selectively improve permeability (permeability coefficient) of carbon dioxide to a gas to be separated, a solubility coefficient (solubility) and/or a diffusion coefficient (diffusibility) of carbon dioxide to a polymer membrane only needs to be selectively improved. Carbon dioxide has quadrupolar structure polarized in a molecule, and has affinity with chemical structure having polarity. For example, polyethylene glycol is reported to have high solubility with carbon dioxide (see Journal of Physical Chemistry, 1990, 94, 2124-2128). Study has been made for a separation membrane containing a polyethyleneoxy (PEO) composition by taking an advantage of such a viewpoint (see Journal of Membrane Science, 1999, 160, 87-99). This results from strong interaction of carbon dioxide with the polyethyleneoxy composition. This polyethyleneoxy membrane is a flexible and rubbery polymer membrane having a low glass transition temperature, and therefore a difference of diffusion coefficients depending on gas species is small, and separation selectivity is mainly caused due to an effect of a difference in solubility.

In contrast, according to the present invention, a polymer chain of polyimide is linked by a specific crosslinking chain. Therefore, characteristic diffusion selectivity (high gas selectivity) is considered to be developed by a crosslinked form thereof being optimized in combination with solubility and diffusibility of the polyimide compound. Moreover, a uniform and degradation-free crosslinked form is thus realized in a membrane, which is considered to have good bending properties and to be adapted also for a thin supporting layer and to develop excellent production competence and to realize stability over time also. Hereinafter, the present invention is described in detail.

[Composite Membrane]

Figure 2:
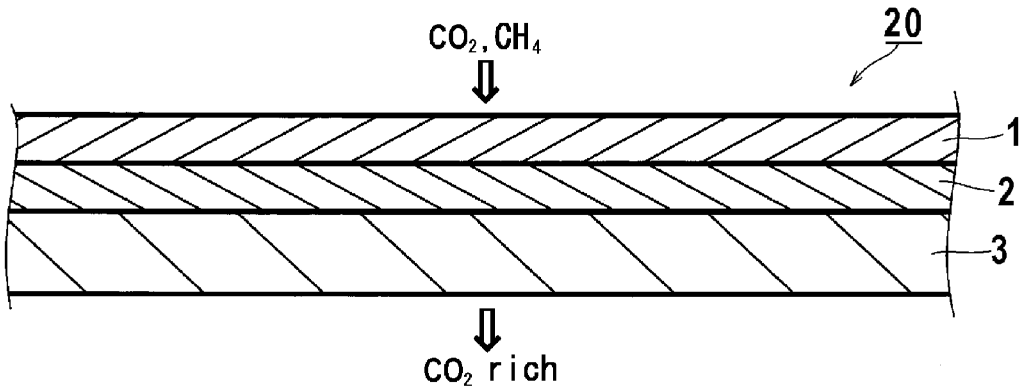
{FIG. 2}

The composite membrane according to the present invention has a gas separating layer containing a crosslinked polyimide resin formed over a gas-permeable supporting layer. This composite membrane is preferably formed by coating a coating liquid (dope) to form the above-described gas separating layer ("coating" herein includes an embodiment in which the coating liquid is attached on the surface by dipping) at least on a surface of a porous support, and irradiating the resultant coated surface with active radiation. FIG. 1 is a cross-sectional view schematically showing a gas separation composite membrane 10, being a preferred embodiment according to the present invention. The reference sign 1 is a gas separating layer and the reference sign 2 is a supporting layer constituted of a porous layer. FIG. 2 is a cross-sectional view schematically showing a gas separation composite membrane 20, being a preferred embodiment according to the present invention. According to this embodiment, in addition to the gas separating layer 1 and the porous layer 2, a nonwoven fabric layer 3 is added as the supporting layer.

An expression "over the supporting layer" means that any other layer may be interposed between the supporting layer and the gas separating layer. In addition, unless otherwise noted, with regard to expressions "over" and "under", a direction in which a gas to be separated is supplied is referred to as "over", and a direction from which a separated gas is discharged is referred to "under". However, the present invention is in no way construed by being limited by these explanations and an attached drawing.

The gas separation composite membrane according to the present invention may have the gas separating layer formed and arranged on the surface or inside of the porous support (supporting layer). The gas separating layer may be applied and formed on the surface, to provide a composite membrane. Formation of the gas separating layer at least on the surface of the porous support allows realization of a composite membrane having advantages of high separation selectivity, high gas permeability and also mechanical strength. Regarding the membrane thickness of the separating layer, the membrane is preferably as thin as possible under conditions to provide superior gas permeability while maintaining mechanical strength and separation selectivity.

The thickness of the gas separating layer of the gas separation composite membrane according to the present invention is not particularly limited, but is preferably from 0.01 to 5.0 μm, and more preferably from 0.1 to 2.0 μm. Herein, a term "to" is used in the meaning of being identical with a symbol "–", and includes numerical values or numbers defined before and after the values.

The porous support (porous layer) preferably applied for the support layer is not particularly limited so long as it satisfies mechanical strength and high gas permeability, may be a porous membrane made of any organic or inorganic substance and is preferably an organic polymer porous membrane. The thickness thereof is preferably from 1 to 3,000 μm, more preferably from 5 to 500 μm, and further preferably from 5 to 150 μm. Regarding this fine pore structure of porous membrane, a mean pore diameter is ordinarily 10 μm or less, preferably 0.5 μm or less, and more preferably 0.2 μm or less, and a porosity is preferably from 20% to 90%, and more preferably from 30% to 80%. In addition, the gas permeability is preferably $3\times10^{-5}$ $cm^3$(STP)/$cm^2$·sec·cmHg (30 GPU) or more, based on carbon dioxide permeation rate.

Herein, 1 GPU is defined to be $1\times10^{-6}$ $cm^3$ (STP)/$cm^2$·sec·cmHg.

Examples of the material for the porous membrane include conventionally known polymers, including polyolefin-based resins such as polyethylene and polypropylene; fluorine-containing resins such as polytetrafluoroethylene, polyvinyl fluoride, and polyvinylidene fluoride; and various resins such as polystyrene, cellulose acetate, polyurethane, polyacrylonitrile, polyphenyleneoxide, polysulfone, polyethersulfone, polyimide and polyaramide. Above all, from viewpoints of excellent production competence upon coating the above-described polyimide compound and performing crosslinking, attaining both of high gas permeability and separation selectivity, the supporting layer is preferably constituted of polyacrylonitrile, polysulfone or polyphenylene oxide, and further preferably polyacrylonitrile. The shape of the porous membrane may be any of plate, spiral, tubular or hollow fibers.

In the present invention, application of the supporting layer forming the gas separating layer is to be essentially required. As mentioned above, this supporting layer being a thin and porous raw material is preferred due to capability of securing sufficient gas permeability. Moreover, the supporting layer is preferably in a thin membrane and porous form also for maximizing excellent gas separation selectivity of the gas separating layer as mentioned later. On the one hand, when severe reaction conditions such as a high temperature and long time are imposed on shaping of the gas separation membrane, the conditions may occasionally damage the above-mentioned thin and porous supporting layer not to allow development of sufficient performance as the composite membrane. From such a viewpoint, the gas separation composite membrane using the polyimide compound having the structure crosslinked through the specific crosslinking chain employed in the present invention can be formed under mild conditions to allow production of an excellent effect, and development of high performance in both of the production competence and product quality.

In the present invention, in order to further provide the membrane with mechanical strength, a support is desirably formed in a lower part (on a side opposite to the gas separating layer) of the porous layer being the supporting layer for forming the gas separating layer. Specific examples of such a support include a woven fabric, a nonwoven fabric and a net, and a nonwoven fabric is preferably used in view of membrane-forming properties and cost. As the nonwoven fabric, fibers formed of polyester, polypropylene, polyacrylonitrile, polyethylene, polyamide or the like may be used alone or in combination with a plurality of fibers. The nonwoven fabric can be produced, for example, by paper making of main fibers and binder fibers that are uniformly dispersed in water, using a cylinder mold, a fourdrinier or the like, and drying the resultant product by a drier. Moreover, the nonwoven fabric is preferably interposed between two rolls and subjected to pressure heating processing for the purpose of removing fluff or improving mechanical properties.

In the present invention, a cutoff molecular weight of the porous layer is preferably 100,000 or less.

[Crosslinked Structure]

In the present invention, the crosslinked polyimide resin has, on a crosslinked structural site thereof, a linking group of $—NR^aC(=O)—$, $—NR^bC(=O)O—$, $—CH_2OCH_2—$, $—CH_2SCH_2—$, $—OC(=O)O—$, $—C(=O)O^-N^+(R^c)_3—$, $—SO_3^-N^+(R^d)_3—$ or $—PO_3^-N^+(R^e)_3—$. Among these, $—NHC(=O)—$, $—CH_2OCH_2—$, $—C(=O)O^-N^+(R^c)_3—$, and $—SO_3^-N^+(R^d)_3—$ are preferable; and $—NHC(=O)—$, $—C(=O)O^-N^+(R^c)_3—$, and $—SO_3^-N^+(R^d)_3—$ are more preferable.

•$R^a$, $R^b$, $R^c$, $R^d$ and $R^e$ $R^a$, $R^b$, $R^c$, $R^d$ and $R^e$ each independently represent a hydrogen atom or a substituent. As the substituent, the below-mentioned substituent group Z is exemplified, and above all, $R^a$, $R^b$, $R^c$, $R^d$ and $R^e$ are preferably a hydrogen atom or an alkyl group. As the alkyl group, an alkyl group having 1 to 10 carbon atoms is preferred, and an alkyl group having 1 to 6 carbon atoms is more preferred. The alkyl group may further have a substituent. A plurality of $R^a$, $R^b$, $R^c$, $R^d$ and $R^e$ may be identical or different, and may be bonded or subjected to ring condensation with each other to form a ring.

The crosslinking chain having the linking group as described above advantageously acts on improvement of stability and improvement of separation selectivity of resin composed of the crosslinked polyimide resin. Relation with chemical structure can be explained as described below, although partial estimation is included. For example, amide [$—NHC(=O)—$], urethane [$—NHC(=O)O—$], ether ($—CH_2OCH_2—$) or carbonate ($—OC(=O)O—$) is generally a stable bond, which is considered to contribute also to stabilization of the membrane. In particular, an amide bond or an ether bond has significantly higher stability to acid and alkali in comparison with an ester bond.

On the other hand, $—C(=O)O^-N^+(R^c)_3—$, $—SO_3^-N^+(R^d)_3—$ and $—PO_3^-N^+(R^e)_3—$ have high polarity, which is considered to contribute to enhancement of compatibility with carbon dioxide. Conversely, solubility of an unpolarized nonpolar gas molecule such as methane and hydrocarbon rather decreases, and separation selectivity is improved.

In addition thereto, such resin has excellent production competence. For example, one having the above-described ionic linking group is comparatively easily synthesized, and therefore a crosslinked site ratio can be adjusted after synthesizing the polymer. Therefore, characteristics such as permeability and separation selectivity can be controlled by an amount of addition of a predetermined agent or the like, which is considered to contribute to further improvement of membrane performance.

[Polyimide Compound]

The polyimide compound for use in the present invention preferably contains a repeating unit represented by Formula (I), at least one kind of repeating unit represented by Formula (II-a) or (II-b) and at least one kind of repeating unit represented by Formula (III-a) or (III-b).

Formula (I)

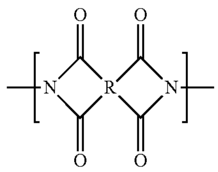

In Formula (I), R is preferably a group of atoms selected from the group consisting of the groups represented by any one of Formulas (I-a) to (I-g).

Formula (I-a)

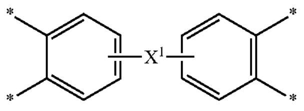

Formula (I-b)

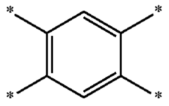

Formula (I-c)

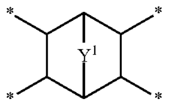

Formula (I-d)

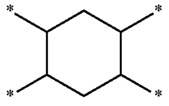

Formula (I-e)

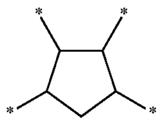

Formula (I-f)

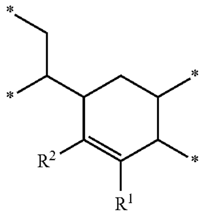

Formula (I-g)

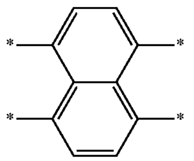

In Formulas (I-a) to (I-g), $X^1$ represents a single bond or a bivalent linking group. $Y^1$ represents a methylene group or a vinylene group. $R^1$ and $R^2$ each independently represent a hydrogen atom or a substituent. Alternatively, $R^1$ and $R^2$ may bond with each other to form a ring. The symbol "*" represents a binding site with the carbonyl group of the imide in Formula (I).

It is further preferable that the polyimide compound further contains at least one kind of repeating unit represented by Formula (II-a) or (II-b) and at least one kind of repeating unit represented by Formula (III-a) or (III-b), and R of the repeating unit represented by Formula (I) is a group of atoms selected from the group consisting of the groups represented by any one of Formulas (I-a) to (I-g).

Formula (II-a)

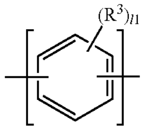

-continued

Formula (II-b)

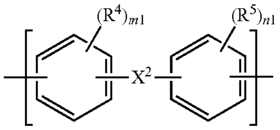

In Formulas (II-a) and (II-b), $R^3$ represents an alkyl group, a hydroxyl group, a carboxyl group, a sulfonic acid group, an amino group or a halogen atom. l1 represents an integer of from 0 to 4. $R^4$ and $R^5$ each independently represent an alkyl group, a hydroxyl group, a carboxyl group, a sulfonic acid group, an amino group or a halogen atom. $R^4$ and $R^5$ may bond with each other to form a ring. m1 and n1 each independently represent an integer of from 0 to 4. $X^2$ represents a single bond or a bivalent linking group.

Herein, the "amino group" includes an amino group, an alkyl amino group, an arylamino group and a heterocyclic amino group.

Formula (III-a)

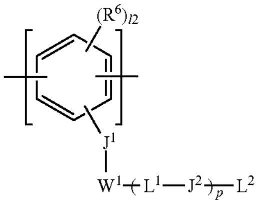

Formula (III-b)

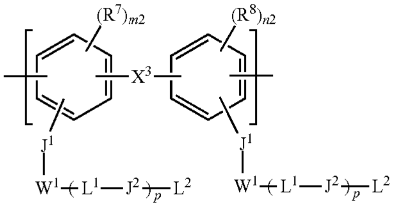

In Formulas (III-a) and (III-b), $R^6$, $R^7$ and $R^8$ each independently represent a substituent. $R^7$ and $R^8$ may bond with each other to form a ring. $J^1$ and $J^2$ each independently represent at least one kind of linking group selected from the group consisting of $—NR^aC(=O)—$, $—NR^bC(=O)O—$, $—CH_2OCH_2—$, $—CH_2SCH_2—$, $—OC(=O)O—$, $—C(=O)O^-N^+(R^c)_3—$, $—SO_3^-N^+(R^d)_3—$ and $—PO_3^-N^+(R^e)_3—$. $R^a$, $R^b$, $R^c$, $R^d$ and $R^e$ each independently represent a hydrogen atom or a substituent. $W^1$ represents a single bond or a bivalent linking group. l2, m2 and n2 each independently represent an integer of from 0 to 3. $L^1$ represents a bivalent linking group. $L^2$ represents a functional group. p represents an integer of 0 or more. When p is 2 or more, $L^1$'s and $J^2$'s may be the same or different from each other. $X^3$ represents a bivalent linking group.

R in Formula (I) may be occasionally referred to as a scaffold. This scaffold (R) is preferably represented by Formula (I-a), (I-b) or (I-c), more preferably Formula (I-a) or (I-c), and particularly preferably Formula (I-a).

In the present invention, among these, Formula (I-a') is preferable.

Formula (I-a')

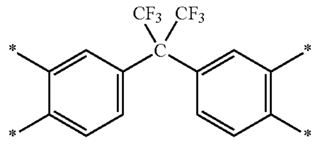

•$X^1$, $X^2$ and $X^3$ $X^1$, $X^2$ and $X^3$ are contained in Formulas (I-a), (II-b) and (III-b). $X^1$, $X^2$ and $X^3$ each independently represent a single bond or a divalent linking group. Preferred specific examples of the linking group include —C(Ra)$_2$— (Ra represents a hydrogen atom or a substituent; and when Ra is a substituent, two Ra's may bond with each other to form a ring), —O—, —SO$_2$—, —C(═O)—, and —S—; more preferred specific examples include —C(Ra)$_2$—, —O—, —SO$_2$—, and —C(═O)—; and further preferred specific examples include —C(Ra)$_2$—. Herein, Ra is preferably a hydrogen atom or an alkyl group, more preferably an alkyl group, and particularly preferably $CF_3$.

•$R^1$ and $R^2$ $R^1$ and $R^2$ each independently represent a hydrogen atom or a substituent. The substituent has the same meaning as that exemplified as the substituent group Z described below, and the preferable range is also the same.

$R^1$ and $R^2$ each are preferably a hydrogen atom or an alkyl group; more preferably a hydrogen atom, a methyl group or an ethyl group; and further preferably a hydrogen atom.

•$R^3$, $R^4$ and $R^5$ $R^3$, $R^4$ and $R^5$ each independently represent an alkyl group, a hydroxyl group, a carboxyl group, a sulfonic acid group, an amino group or a halogen atom. These preferred ones are defined in a manner identical with the definitions in the substituent group Z, and preferable ranges thereof are also the same. Subscripts l1, m1 and n1 are an integer from 0 to 4, preferably from 1 to 4, and more preferably 3 or 4.

$R^3$ is preferably an alkyl group or a halogen atom, more preferably an alkyl group, and particularly preferably a methyl group. l1 is most preferably 4.

Here, when a plurality of $R^3$, $R^4$ and $R^5$ are present for each, these may bond with each other to form a ring. Alternatively, $R^4$ and $R^5$ may bond with each other to form a ring.

In the present invention, one in which $R^4$ and $R^5$ bond with each other to form a ring is also preferred, and specific examples of the group formed by linking of $R^4$ and $R^5$ include —SO$_2$—, —CH$_2$—, —O— and —S—.

•$R^6$, $R^7$ and $R^8$ $R^6$, $R^7$ and $R^8$ each independently represent a substituent. These preferred ones are defined in a manner identical with the definitions in the substituent group Z, and preferable ranges thereof are also the same. Subscripts l2, m2 and n2 are an integer from 0 to 3, preferably from 0 to 2, more preferably 0 or 1, and particularly preferably 0.

Here, when a plurality of $R^6$, $R^7$ and $R^8$ are present for each, these may bond with each other to form a ring. Alternatively, $R^7$ and $R^8$ may bond with each other to form a ring.

In the present invention, one in which $R^7$ and $R^8$ bond with each other to form a ring is also preferred, and specific examples of the group formed by linking of $R^7$ and $R^8$ include —SO$_2$—, —CH$_2$—, —O— and —S—.

•$J^1$ and $J^2$ $J^1$ and $J^2$ each independently represent at least one kind of linking group selected from the group consisting of *—NR$^a$C(═O)—**, *—NR$^b$C(═O)O—**, *—CH$_2$OCH$_2$—**, *—CH$_2$SCH$_2$—**, *—OC(═O)O—**, *—C(═O)O$^-$N$^+$(R$^c$)$_3$—**, *—SO$_3^-$N$^+$(R$^d$)$_3$—**, and *—PO$_3^-$N$^+$(R$^c$)$_3$—**. Here, the symbol "*" represents a bonding hand on a side of the phenylene group and the symbol "**" represents a bonding hand on a side of $W^1$ for $J^1$. The symbol "*" represents a bonding hand on a side of $L^1$ and the symbol "**" represents a bonding hand on a side of $L^2$ for $J^2$.

$R^a$, $R^b$, $R^c$, $R^d$ and $R^e$ each independently represent a hydrogen atom or a substituent. A preferred range of $R^a$, $R^b$, $R^c$, $R^d$ or $R^e$ is defined in a manner identical with the definitions as explained in the above-described crosslinking chain.

Among these, $J^1$ and $J^2$ each are preferably *—NR$^a$C(═O)—**, *—CH$_2$OCH$_2$—**, *—C(═O)O$^-$N$^+$(R$^c$)$_3$—**, and *—SO$_3^-$N$^+$(R$^d$)$_3$—**; and more preferably *—NHC(═O)—**, *—C(═O)O$^-$N$^+$(R$^c$)$_3$—**, and *—SO$_3^-$N$^+$R$^d{}_3$—**. A reason for these linking groups to constitute the crosslinking chain and to produce a further excellent effect is similar to an estimated reason as described in the item of the above-described crosslinked structure.

•$W^1$ $W^1$ represents a single bond or a bivalent linking group. Examples of the bivalent linking group include linear, branched or cyclic alkylene groups (preferably alkylene groups having 1 to 30 carbon atoms, more preferably alkylene groups having 1 to 12 carbon atoms, further preferably alkylene groups having 1 to 4 carbon atoms, examples thereof include methylene, ethylene, propylene, butylene, pentylene, hexylene, octylene, decylene and the like), alkyleneoxy groups (preferably alkyleneoxy groups having 1 to 30 carbon atoms, more preferably alkyleneoxy groups having 1 to 12 carbon atoms, further preferably alkyleneoxy groups having 1 to 4 carbon atoms, and examples thereof include methyleneoxy, ethyleneoxy, propyleneoxy, butyleneoxy, pentyleneoxy, hexyleneoxy, octyleneoxy, decyleneoxy and the like), aralkylene groups (preferably aralkylene groups having 7 to 30 carbon atoms, more preferably aralkylene groups having 7 to 13 carbon atoms, and examples thereof include benzylidene, cinnamylidene and the like), arylene groups (preferably arylene groups having 6 to 30 carbon atoms, more preferably arylene groups having 6 to 15 carbon atoms, and examples thereof include phenylene, cumenylene, mesitylene, tolylene, xylem and the like) and the like. These may further have a substituent.

•$L^1$ $L^1$ represents a bivalent linking group. Specific examples thereof include a linking group composed of a repeating unit represented by any one of (L-1) to (L-35) described below or a combination thereof. Herein, the symbol "*" of the following linking group is a bonding hand on a side of $W^1$, and the symbol "**" is a bonding hand on a side of $J^2$.

(L-1)

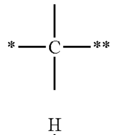

(L-2)

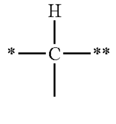

(L-3)

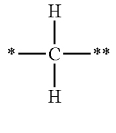

-continued
(L-4)
(L-5)
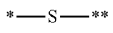
(L-6)
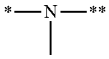
(L-7)
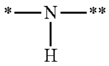
(L-8)
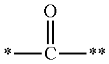
(L-9)
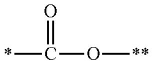
(L-10)
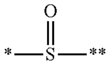
(L-11)
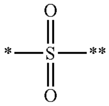
(L-12)
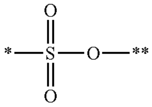
(L-13)
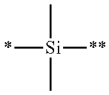
(L-14)
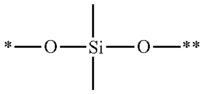
(L-15)
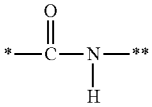
(L-16)
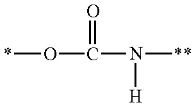
(L-17)
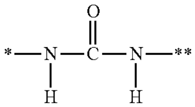
(L-18)
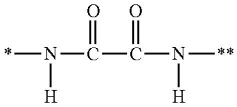
(L-19)
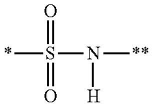
-continued
(L-20)
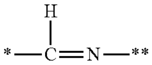
(L-21)
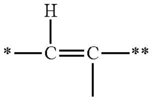
(L-22)
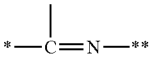
(L-23)
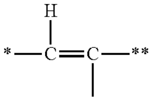
(L-24)
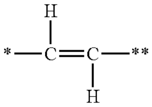
(L-25)
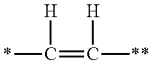
(L-26)
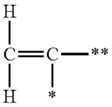
(L-27)
(L-28)
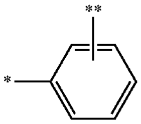
(L-29)
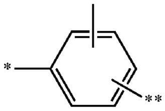
(L-30)
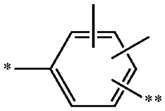
(L-31)
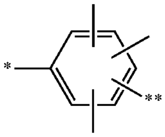
(L-32)
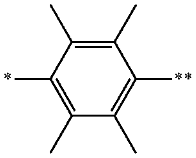

-continued (L-33)

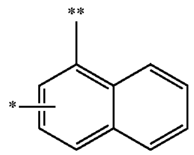

(L-34)

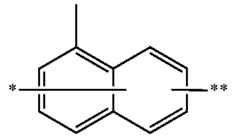

(L-35)

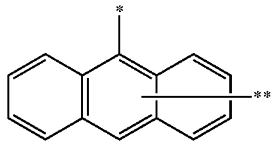

$L^1$ is preferably any one of formulas (L-1) to (L-35), an alkylene group, an alkyleneoxy group or an arylene group.

•$L^2$ $L^2$ represents a crosslinkable functional group. Such a functional group is selected from the group consisting of —NHC(═O)CR$^f$═CH$_2$, —OH, —SH and —CH═CH$_2$; and preferably —NHC(═O)CR$^f$═CH$_2$. R$^f$ represents a hydrogen atom or an alkyl group, and is preferably a hydrogen atom. When R$^f$ is an alkyl group, a preferred range thereof is defined in a manner identical with the definitions of the alkyl group of substituent group Z.

[Crosslinking Method Through a Crosslinking Chain]

Here, the crosslinked polyimide resin for use in the present invention has structure in which the polyimide compound is crosslinked through the above-mentioned specific crosslinking chain. Such a crosslinking method through the crosslinking chain includes a method as described below.

(1) A method for mixing a polymer having a functional group in its side chain, and a crosslinking agent having a functional group allowing acid-base interaction (ionic) with this functional group (preferably a crosslinkable group being an ethylenically unsaturated group); introducing a crosslinkable site by this ionic bond into the polymer; and applying energy (for example, radiation such as ultraviolet light or heat) to allow crosslinking of the crosslinkable site.

(2) A method for synthesizing a polymer in which polymers each having a crosslinkable functional group in its side chain (preferably a crosslinkable group being an ethylenically unsaturated group) are linked by a covalent bond, and applying energy (for example, radiation such as ultraviolet light or heat) to this polymer to allow crosslinking of a crosslinkable site.

(3) A method for allowing a functional group in a side chain of a polymer to react with a crosslinking agent having a group allowing reaction with the functional group to form a covalent bond (preferably a crosslinkable group being an ethylenically unsaturated group), introducing a crosslinkable group into the polymer, and applying energy (for example, radiation such as ultraviolet light or heat) to allow crosslinking of a crosslinkable site.

Each of these methods is typically presented by a reaction scheme described below.

However, the functional group in the side chain of the polymer, the crosslinking agent, and the polymer having the crosslinkable group in the side chain are not limited to ones shown below.

(1) Acid-base interaction (ionic)×acrylamide×UV hardening

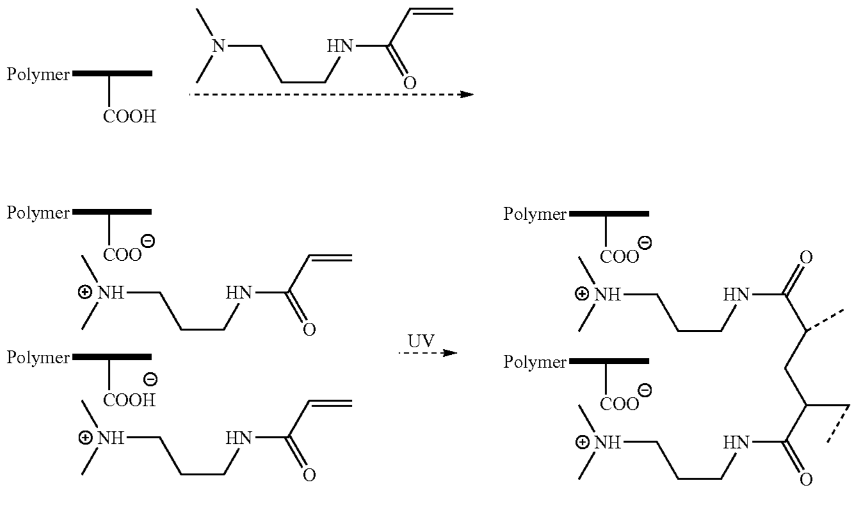

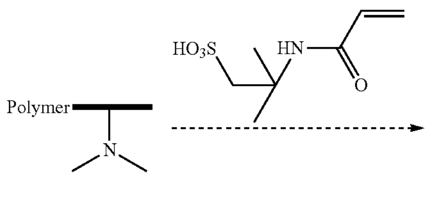

-continued

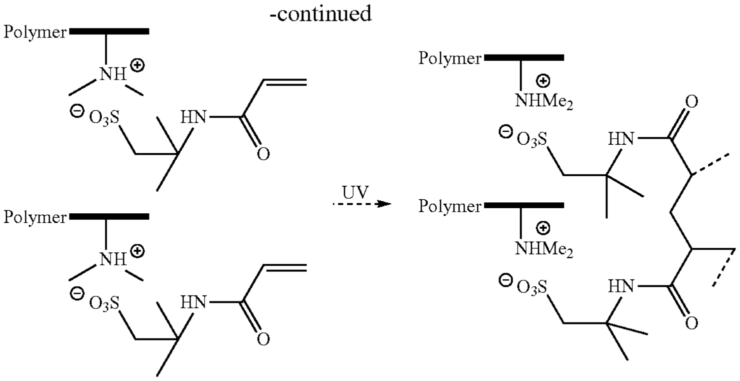

(2) Covalently-bound acrylamide×UV hardening

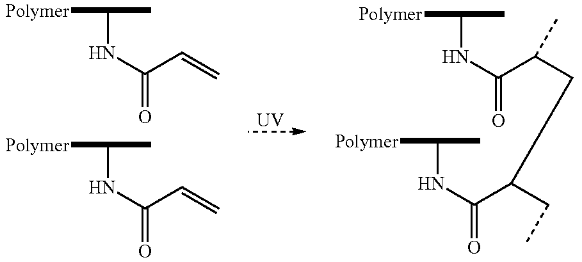

(3) OH (or SH)×polyfunctional aryl×UV hardening

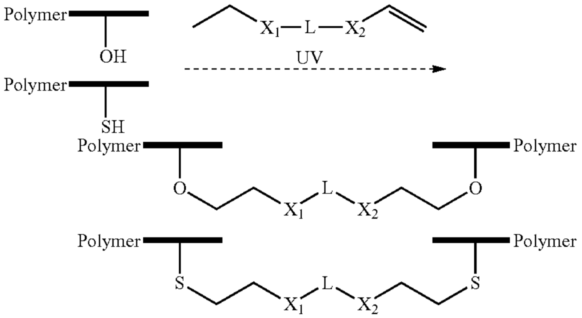

L represents a group selected from the above-described $L^1$ or $L^2$. $X_1$ and $X_2$ represent a group selected from the above-described $J^1$ or $J^2$.

The above-described reaction may be a radical polymerization reaction, a cationic polymerization reaction or a reaction in any other reaction mode.

•p p represents an integer of 0 or more, preferably an integer of from 0 to 10, and more preferably an integer of from 0 to 5. Adjustment of p to the above-described lower limit or more allows a crosslinking reaction, and adjustment to the above-described upper limit or less allows suppression of a decrease in permeability.

<Substituent Group Z>

The substituent group Z includes:

an alkyl group (preferably an alkyl group having 1 to 30 carbon atoms, more preferably an alkyl group having 1 to 20 carbon atoms, particularly preferably an alkyl group having 1 to 10 carbon atoms, and examples thereof include methyl, ethyl, iso-propyl, tert-butyl, n-octyl, n-decyl, and n-hexadecyl), a cycloalkyl group (preferably a cycloalkyl group having 3 to 30 carbon atoms, more preferably a cycloalkyl group having 3 to 20 carbon atoms, particularly preferably a cycloalkyl group having 3 to 10 carbon atoms, and examples thereof include cyclopropyl, cyclopentyl, cyclohexyl and the like), an alkenyl group (preferably an alkenyl group having 2 to 30 carbon atoms, more preferably an alkenyl group having 2 to 20 carbon atoms, particularly preferably an alkenyl group having 2 to 10 carbon atoms, and examples thereof include vinyl, allyl, 2-butenyl, 3-pentenyl and the like), an alkynyl group (preferably an alkynyl group having 2 to 30 carbon atoms, more preferably an alkynyl group having 2 to 20 carbon atoms, particularly preferably an alkynyl group having 2 to 10 carbon atoms, and examples thereof include propargyl, 3-pentynyl and the like), an aryl group (preferably an aryl group having 6 to 30 carbon atoms, more preferably an aryl group having 6 to 20 carbon atoms, particularly preferably an aryl group having 6 to 12 carbon atoms, and examples thereof include phenyl, p-methylphenyl, naphthyl, anthranyl and the like), an amino group (including an amino group, an alkylamino group, an arylamino group and a heterocyclic amino group; preferably an amino group having 0 to 30 carbon atoms, more preferably an amino group having 0 to 20 carbon atoms, particularly preferably an amino group having 0 to 10 carbon atoms, and examples thereof include amino, methylamino, dimethylamino, diethylamino, dibenzylamino, diphenylamino, ditolylamino and the like), an alkoxy group (preferably an alkoxy group having 1 to 30 carbon atoms, more preferably an alkoxy group having 1 to 20 carbon atoms, particularly preferably an alkoxy group having 1 to 10 carbon atoms, and examples thereof include methoxy, ethoxy, butoxy, 2-ethylhexyloxy and the like), an aryloxy group (preferably an aryloxy group having 6 to 30 carbon atoms, more preferably an aryloxy group having 6 to 20 carbon atoms, particularly preferably an aryloxy group having 6 to 12 carbon atoms, and examples thereof include phenyloxy, 1-naphthyloxy, 2-naphthyloxy and the like), a heterocyclic oxy group (preferably a heterocyclic oxy group having 1 to 30 carbon atoms, more preferably a heterocyclic oxy group having 1 to 20 carbon atoms, particularly preferably a heterocyclic oxy group having 1 to 12 carbon atoms, and examples thereof include pyridyloxy, pyrazyloxy, pyrimidyloxy, quinolyloxy and the like), an acyl group (preferably an acyl group having 1 to 30 carbon atoms, more preferably an acyl group having 1 to 20 carbon atoms, particularly preferably an acyl group having 1 to 12 carbon atoms, and examples thereof include acetyl, benzoyl, formyl, pivaloyl and the like), an alkoxycarbonyl group (preferably an alkoxycarbonyl group having 2 to 30 carbon atoms, more preferably an alkoxycarbonyl group having 2 to 20 carbon atoms, particularly preferably an alkoxycarbonyl group having 2 to 12 carbon atoms, and examples thereof include methoxycarbonyl, ethoxycarbonyl and the like), an aryloxycarbonyl group (preferably an aryloxycarbonyl group having 7 to 30 carbon atoms, more preferably an aryloxycarbonyl group having 7 to 20 carbon atoms, particularly preferably an aryloxycarbonyl group having 7 to 12 carbon atoms, and examples thereof include phenyloxycarbonyl and the like), an acyloxy group (preferably an acyloxy group having 2 to 30 carbon atoms, more preferably an acyloxy group having 2 to 20 carbon atoms, particularly preferably an acyloxy group having 2 to 10 carbon atoms, and examples thereof include acetoxy, benzoyloxy and the like), an acylamino group (preferably an acylamino group having 2 to 30 carbon atoms, more preferably an acylamino group having 2 to 20 carbon atoms, particularly preferably an acylamino group having 2 to 10 carbon atoms, and examples thereof include acetylamino, benzoylamino and the like), an alkoxycarbonylamino group (preferably an alkoxycarbonylamino group having 2 to 30 carbon atoms, more preferably an alkoxycarbonylamino group having 2 to 20 carbon atoms, particularly preferably an alkoxycarbonylamino group having 2 to 12 carbon atoms, and examples thereof include methoxycarbonylamino and the like), an aryloxycarbonylamino group (preferably an aryloxycarbonylamino group having 7 to 30 carbon atoms, more preferably an aryloxycarbonylamino group having 7 to 20 carbon atoms, particularly preferably an aryloxycarbonylamino group having 7 to 12 carbon atoms, and examples thereof include phenyloxycarbonylamino and the like), a sulfonylamino group (preferably a sulfonylamino group having 1 to 30 carbon atoms, more preferably a sulfonylamino group having 1 to 20 carbon atoms, particularly preferably a sulfonylamino group having 1 to 12 carbon atoms, and examples thereof include methanesulfonylamino, benzenesulfonylamino and the like), a sulfamoyl group (preferably a sulfamoyl group having 0 to 30 carbon atoms, more preferably a sulfamoyl group having 0 to 20 carbon atoms, particularly preferably a sulfamoyl group having 0 to 12 carbon atoms, and examples thereof include sulfamoyl, methylsulfamoyl, dimethylsulfamoyl, phenylsulfamoyl and the like), a carbamoyl group (preferably a carbamoyl group having 1 to 30 carbon atoms, more preferably a carbamoyl group having 1 to 20 carbon atoms, particularly preferably a carbamoyl group having 1 to 12 carbon atoms, and examples thereof include carbamoyl, methylcarbamoyl, diethylcarbamoyl, phenylcarbamoyl and the like), an alkylthio group (preferably an alkylthio group having 1 to 30 carbon atoms, more preferably an alkylthio group having 1 to 20 carbon atoms, particularly preferably an alkylthio group having 1 to 12 carbon atoms, and examples thereof include methylthio, ethylthio and the like), an arylthio group (preferably an arylthio group having 6 to 30 carbon atoms, more preferably an arylthio group having 6 to 20 carbon atoms, particularly preferably an arylthio group having 6 to 12 carbon atoms, and examples thereof include phenylthio and the like), a heterocyclic thio group (preferably a heterocyclic thio group having 1 to 30 carbon atoms, more preferably a heterocyclic thio group having 1 to 20 carbon atoms, particularly preferably a heterocyclic thio group having 1 to 12 carbon atoms, and examples thereof include pyridylthio, 2-benzimizolylthio, 2-benzoxazolylthio, 2-benzthiazolylthio and the like), a sulfonyl group (preferably a sulfonyl group having 1 to 30 carbon atoms, more preferably a sulfonyl group having 1 to 20 carbon atoms, particularly preferably a sulfonyl group having 1 to 12 carbon atoms, and examples thereof include mesyl, tosyl and the like), a sulfinyl group (preferably a sulfinyl group having 1 to 30 carbon atoms, more preferably a sulfinyl group having 1 to 20 carbon atoms, particularly preferably a sulfinyl group having 1 to 12 carbon atoms, and examples thereof include methanesulfinyl, benzenesulfinyl and the like), a ureido group (preferably a ureido group having 1 to 30 carbon atoms, more preferably a ureido group having 1 to 20 carbon atoms, particularly preferably a ureido group having 1 to 12 carbon atoms, and examples thereof include ureido, methylureido, phenylureido and the like), a phosphoric acid amide group (preferably a phosphoric acid amide group having 1 to 30 carbon atoms, more preferably a phosphoric acid amide group having 1 to 20 carbon atoms, particularly preferably a phosphoric acid amide group having 1 to 12 carbon atoms, and examples thereof include diethylphosphoric acid amide, phenylphosphoric acid amide and the like), a hydroxyl group, a mercapto group, a halogen atom (for example, a fluorine atom, a chlorine atom, a bromine atom and an iodine atom, more preferably a fluorine atom), a cyano group, a sulfo group, a carboxyl group, an oxo group, a nitro group, a hydroxamic acid group, a sulfino group, a hydrazino group, an imino group, a heterocyclic group (preferably a 3- to 7-membered heterocyclic group, which may be an aromatic or non-aromatic heterocyclic group, examples of a hetero atom constituting the heterocyclic group include a nitrogen atom, an oxygen atom and a sulfur atom, and preferably a heterocyclic group having 0 to 30 carbon atoms, more preferably a heterocyclic group having 1 to 12 carbon atoms, and specifically examples of the heterocyclic group include imidazolyl, pyridyl, quinolyl, furyl, thienyl, piperidyl, morpholino, benzoxazolyl, benzimidazolyl, benzthiazolyl, carbazolyl, azepinyl and the like), a silyl group (preferably a silyl group having 3 to 40 carbon atoms, more preferably a silyl group having 3 to 30 carbon atoms, particularly preferably a silyl group having 3 to 24 carbon atoms, and examples thereof include trimethylsilyl, triphenylsilyl and the like), a silyloxy group (preferably a silyloxy group having 3 to 40 carbon atoms, more preferably a silyloxy group having 3 to 30 carbon atoms, particularly preferably a silyloxy group having 3 to 24 carbon atoms, and examples thereof include trimethylsilyloxy, triphenylsilyloxy and the like) and the like. These substituents may be further substituted by one or more substituents selected from the substituent group Z.

Herein, when one structural site has a plurality of substituents, those substituents may be linked with each other to form a ring, or may be subjected to ring condensation partially or wholly with the above-described structural site to form an aromatic ring or an unsaturated heterocycle.

Preferred specific examples of the polyimide compound are shown in the followings, but the present invention is not limited thereto. Upon obtaining the crosslinked membrane for use in the present invention, these polymers may be used alone or in combination with the below-mentioned crosslinking agent.

P-1
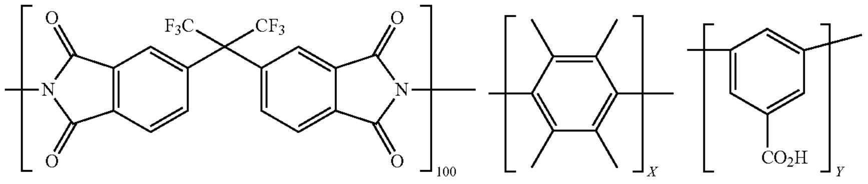
P-2
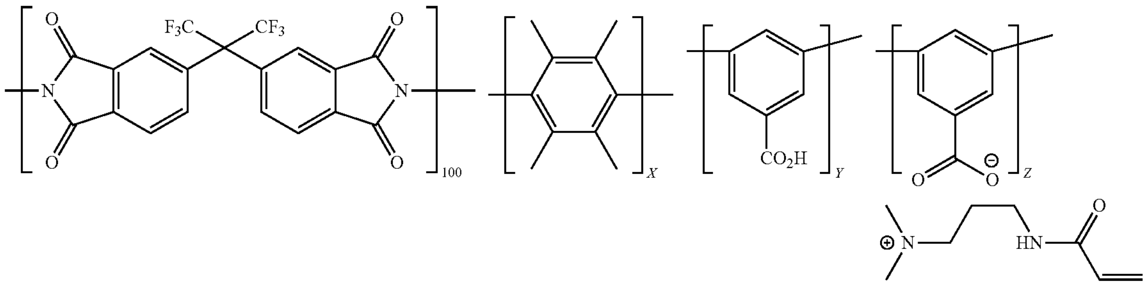
P-3
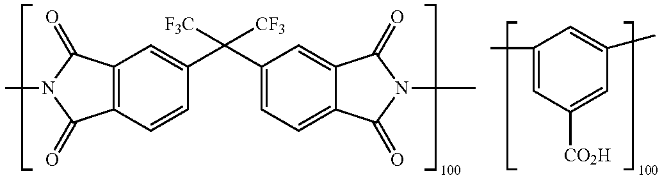
P-4
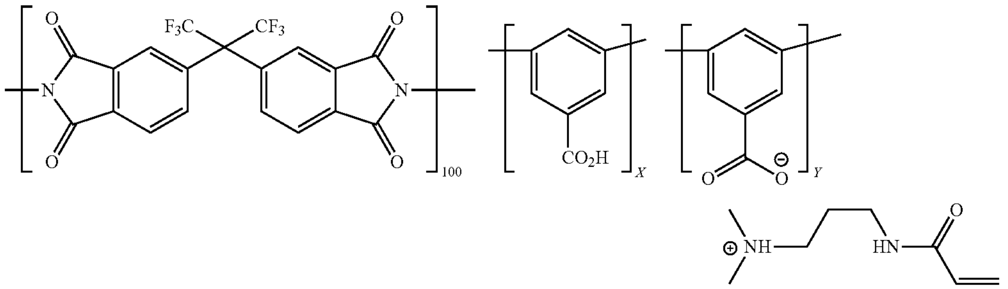
P-5
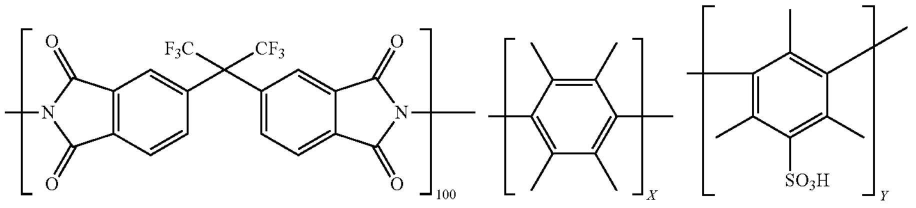
P-6
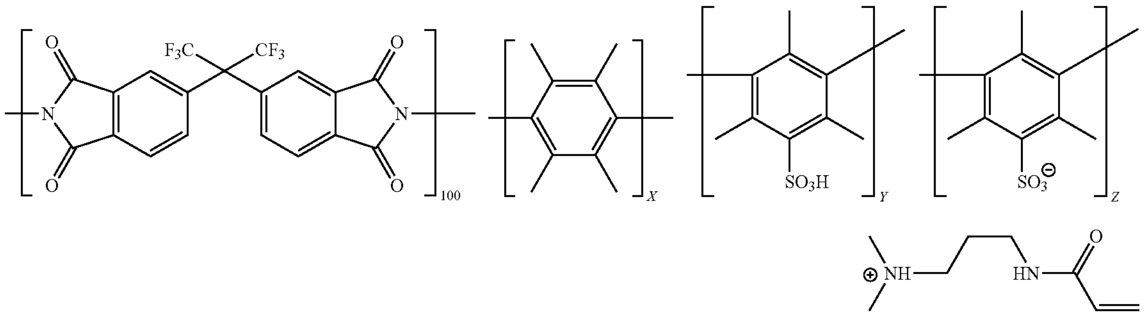

-continued
P-7
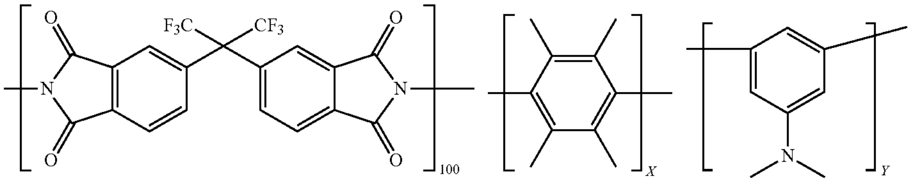
P-8
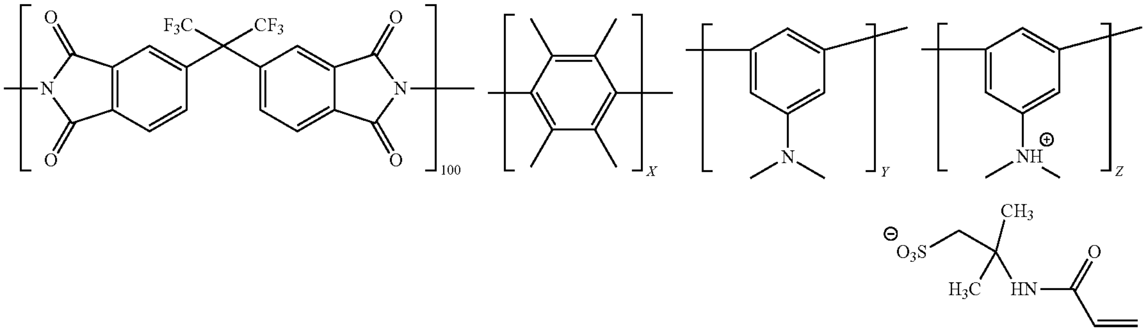
P-9
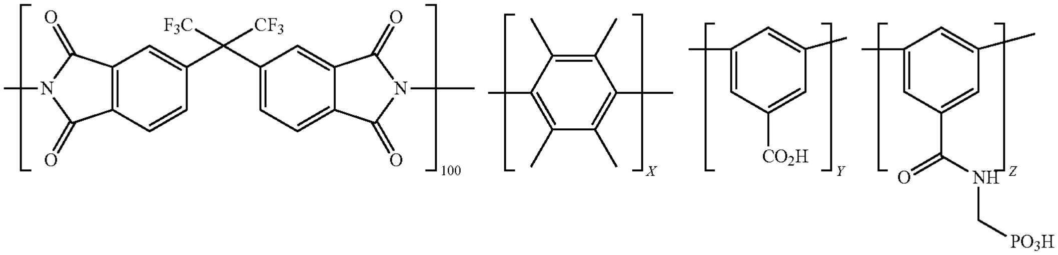
P-10
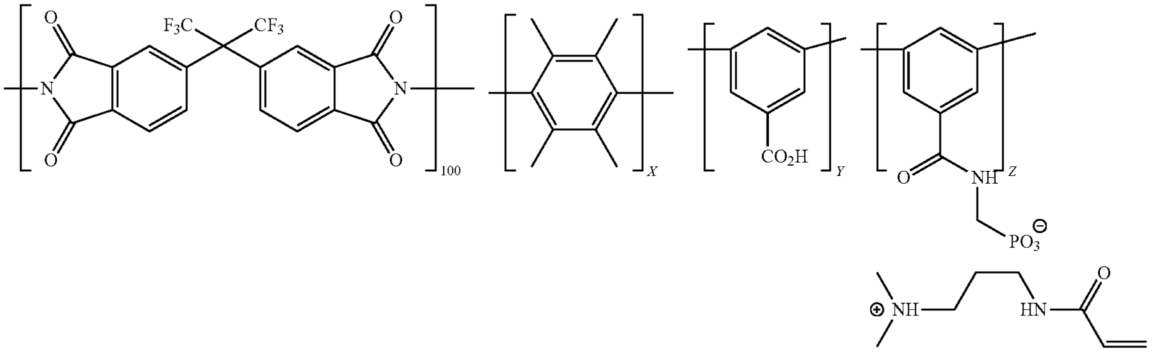
P-11
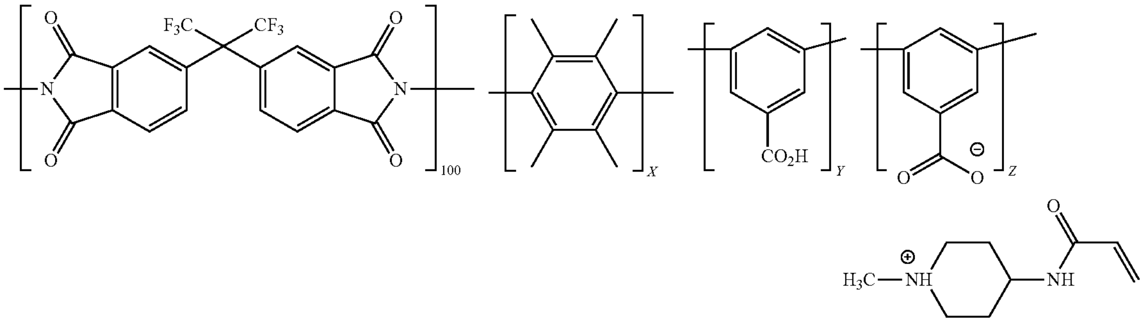

-continued
P-12
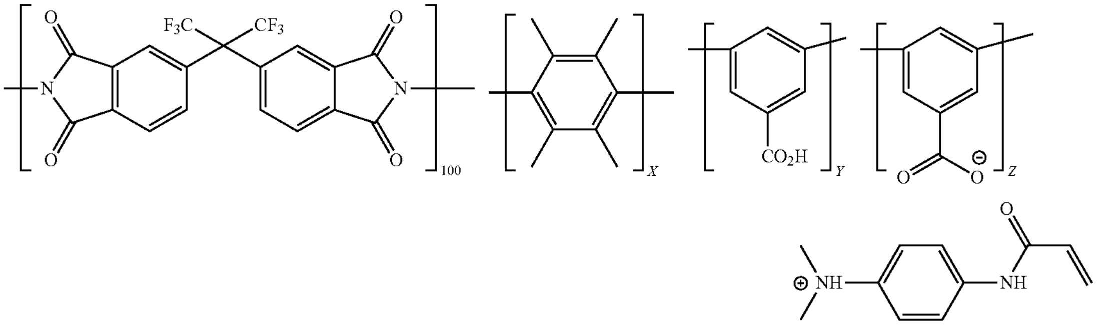
P-13
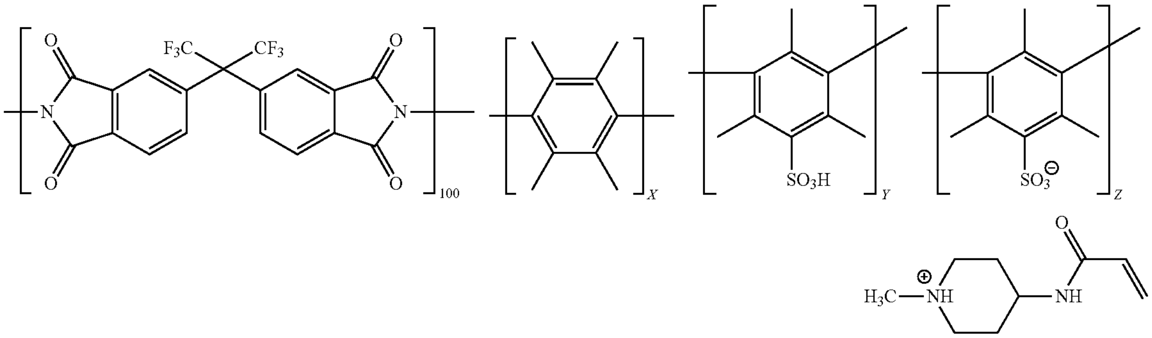
P-14
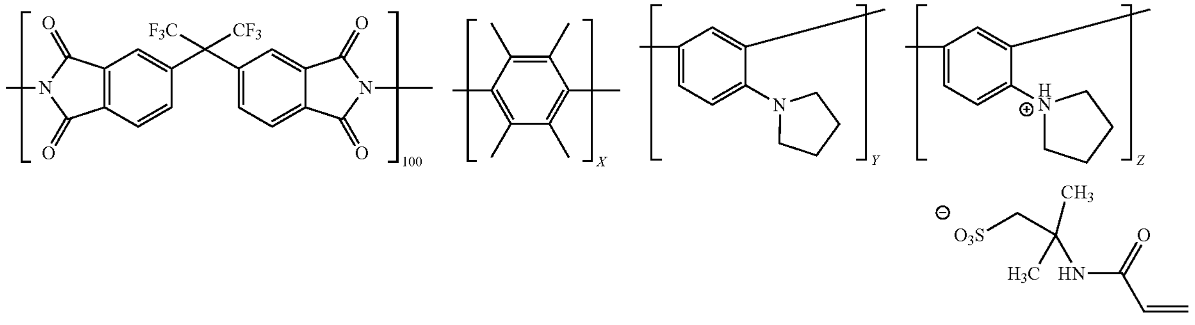
P-15
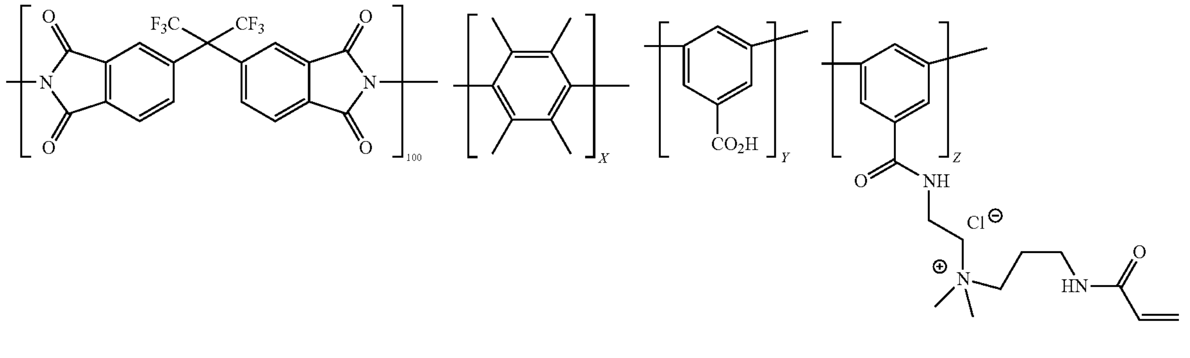

-continued
P-16
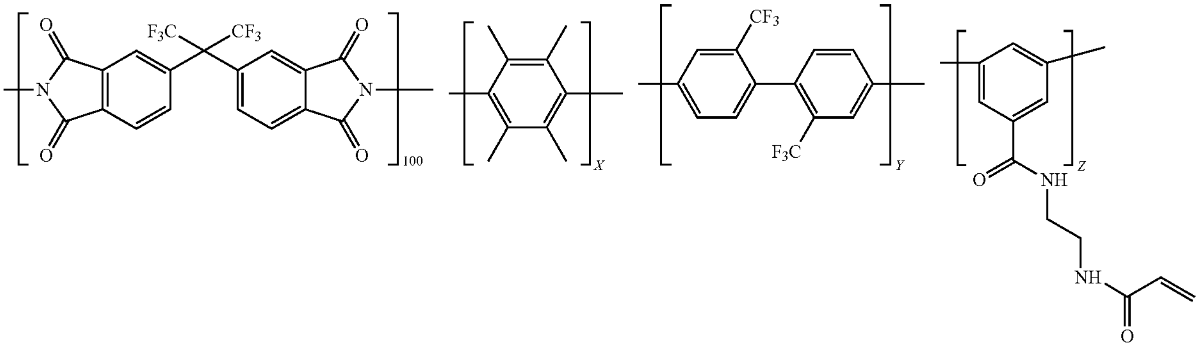
P-17
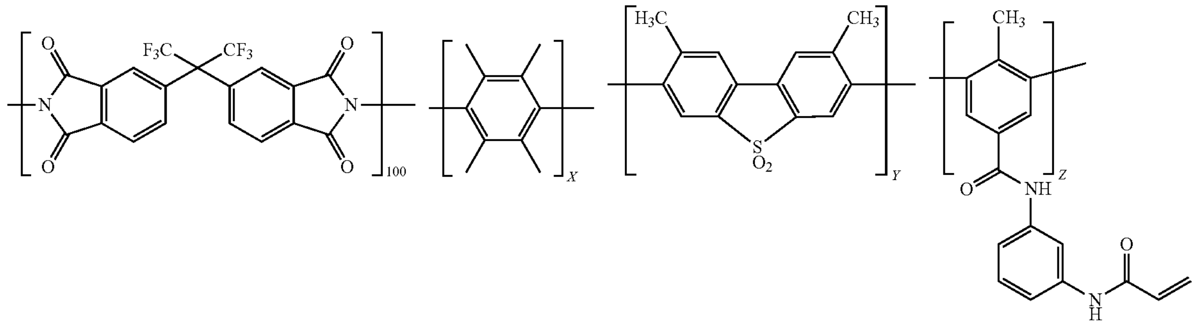
P-18
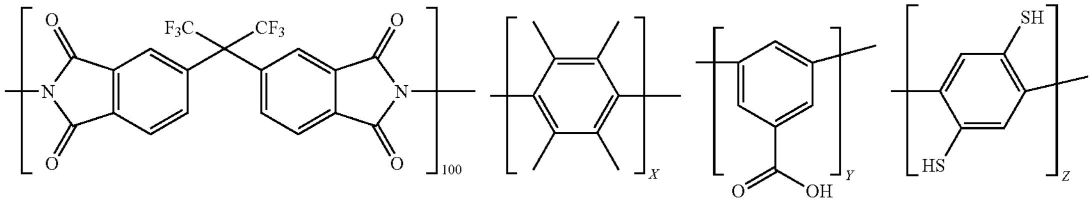
P-19
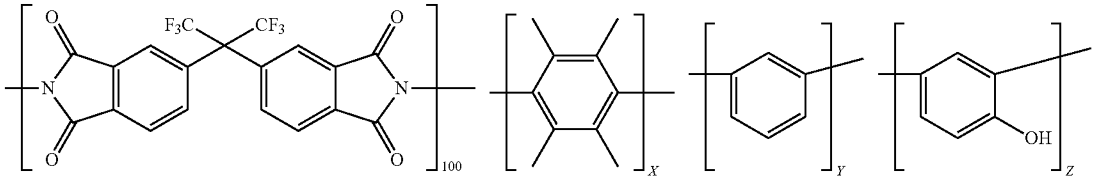
P-20
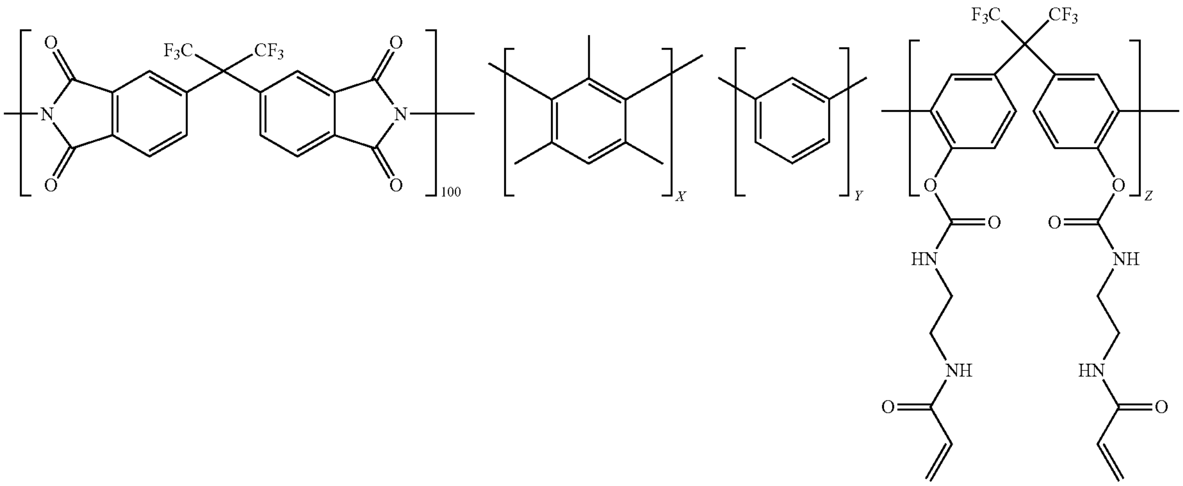

-continued
P-21
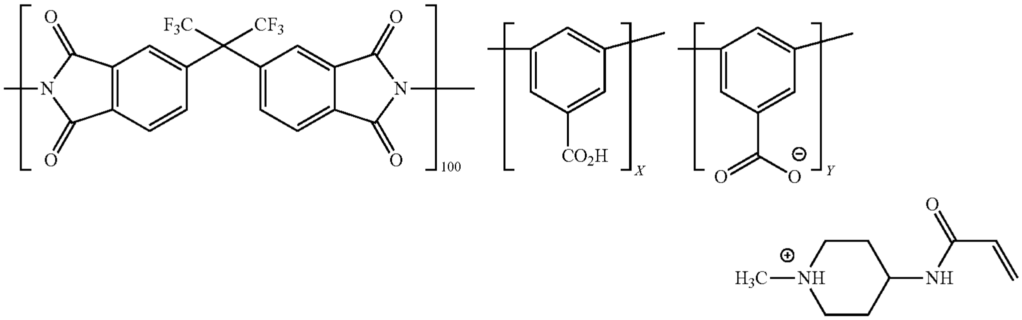
P-22
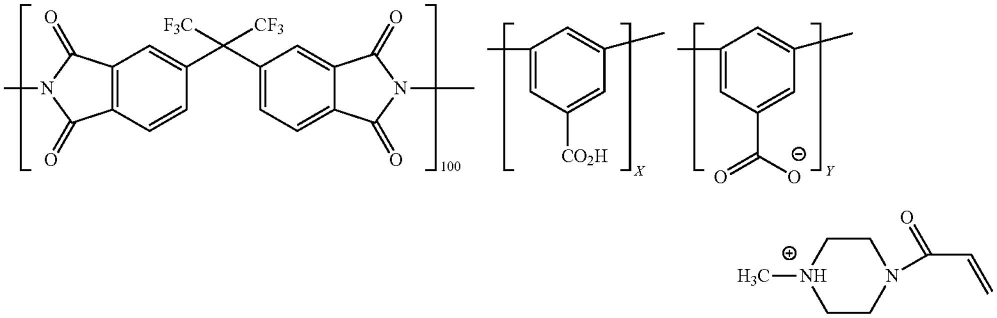
P-23
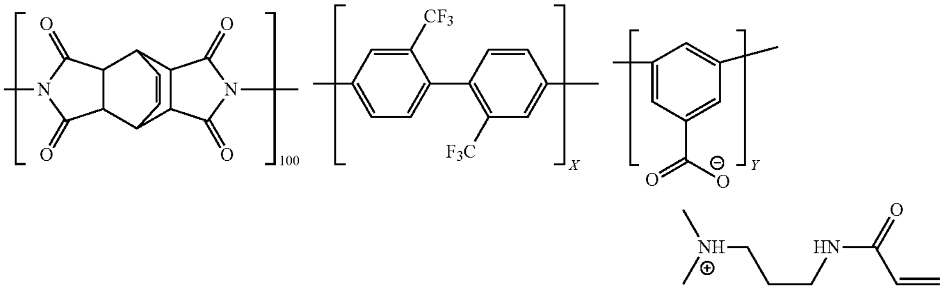
P-24
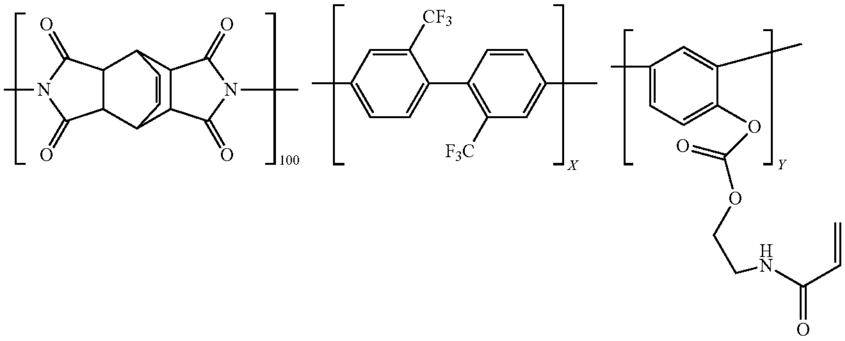
P-25
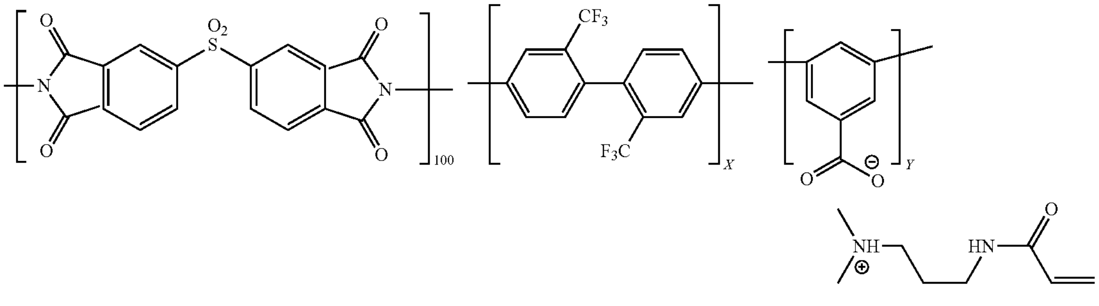

TABLE 1

| [Ratio of X/Y/Z] | | | | |
|---|---|---|---|---|
| | Molecular Weight | X | Y | Z |
| P-1 | 135000 | 60 | 40 | — |
| P-2 | 135000 | 60 | 30 | 10 |
| P-3 | 98000 | — | — | — |
| P-4 | 98000 | 95 | 5 | — |
| P-5 | 78000 | 20 | 80 | — |
| P-6 | 78000 | 20 | 70 | 10 |
| P-7 | 110000 | 40 | 60 | — |
| P-8 | 110000 | 40 | 50 | 10 |
| P-9 | 47000 | 50 | 45 | 5 |
| P-10 | 47000 | 50 | 45 | 5 |
| P-11 | 135000 | 60 | 30 | 10 |
| P-12 | 135000 | 60 | 30 | 10 |
| P-13 | 98000 | 20 | 70 | 10 |
| P-14 | 64000 | 40 | 50 | 10 |
| P-15 | 70000 | 10 | 80 | 10 |
| P-16 | 48000 | 40 | 45 | 5 |
| P-17 | 45000 | 40 | 40 | 20 |
| P-18 | 320000 | 40 | 40 | 20 |
| P-19 | 180000 | 40 | 40 | 20 |
| P-20 | 38000 | 60 | 30 | 10 |
| P-21 | 98000 | 95 | 5 | — |
| P-22 | 98000 | 95 | 5 | — |
| P-23 | 61000 | 95 | 5 | — |
| P-24 | 37000 | 95 | 5 | — |
| P-25 | 40000 | 95 | 5 | — |

Molar ratio in the above-described chemical formulas [ratio of X/Y/Z based on 100 of a specific unit in the formula]

Herein, the "molecular weight" means weight-average molecular weight.

The polymer for use in the present invention may be a copolymer with other monomers. Examples of other monomers include known monomers such as acrylates, methacrylates, acrylamides, methacrylamides, vinyl esters, styrenes, acrylic acid, methacrylic acid, acrylonitrile, maleic anhydride and maleic imide. By copolymerizing these monomers, various physical properties such as membrane-forming property, membrane strength, hydrophilicity, hydrophobicity, solubility, reactivity and stability can be improved. The synthesis of monomers is for example carried out with reference to ester synthesis of "5$^{th}$ experiment science lecture 16, organic synthesis (II-1)" or handling or purification items of monomers of "5$^{th}$ experiment science lecture 26, polymer chemistry" edited by the Japanese Chemical Society (issued by Maruzen Co. Ltd.).

The polyimide can be synthesized by condensation polymerization of an acid anhydride with a diamine As a synthetic method, a method described in a general book (for example, Saishin Polyimide-Kilo to Oyo-, pp. 3-49, edited by Yoshio Imai and Rikio Yokota, issued by NTS Publishing Co., Ltd.) can be appropriately selected. Specific examples of general acid anhydride that can be used in the present invention are shown below.

Anhydride-1

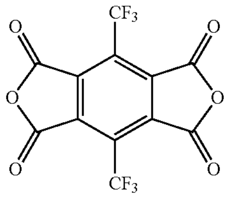

Anhydride-2

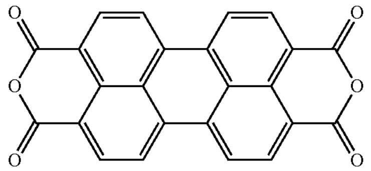

Anhydride-3

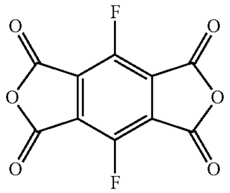

Anhydride-4

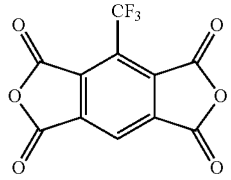

Anhydride-5

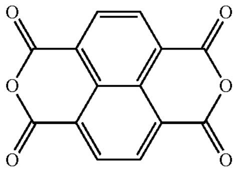

Anhydride-6

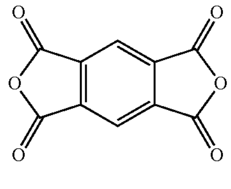

Anhydride-7

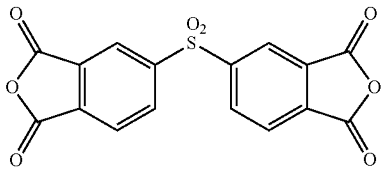

Anhydride-8

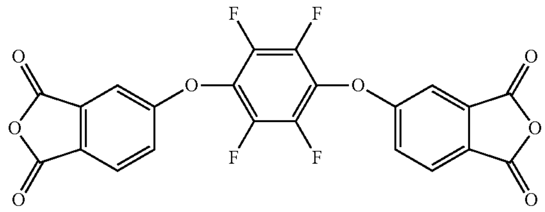

-continued
Anhydride-9
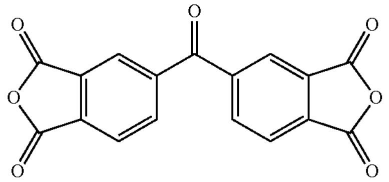
Anhydride-10
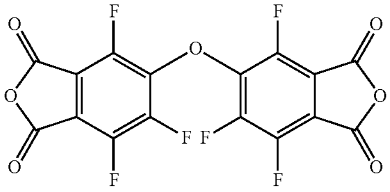
Anhydride-11
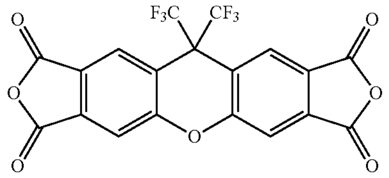
Anhydride-12
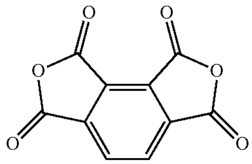
Anhydride-13
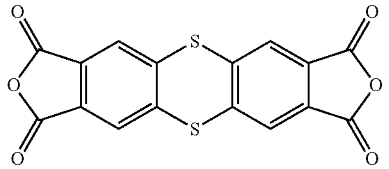
Anhydride-14
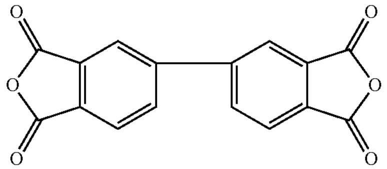
Anhydride-15
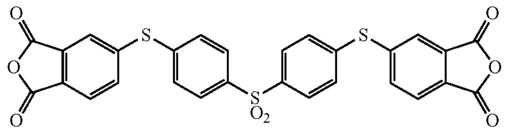
Anhydride-16
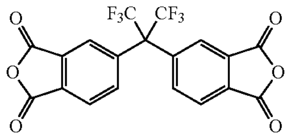
Anhydride-17
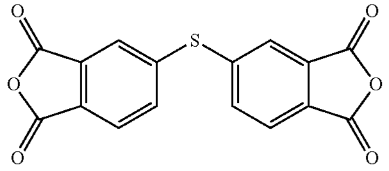
Anhydride-18
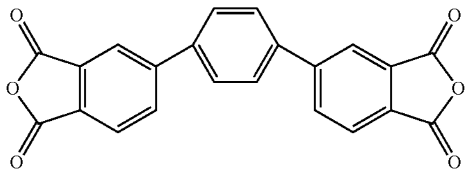
Anhydride-19
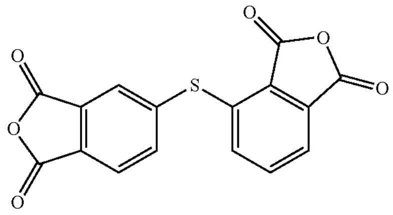
Anhydride-20
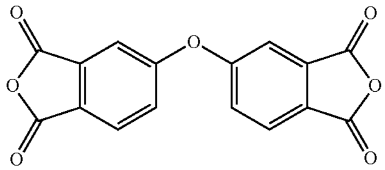
Anhydride-21
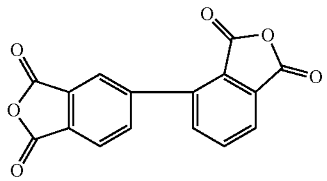
Anhydride-22
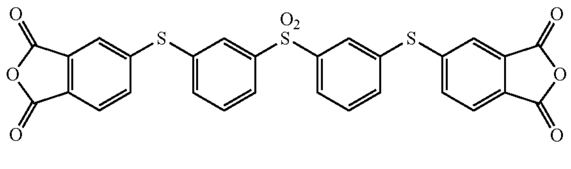
Anhydride-23
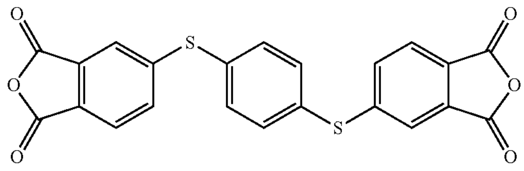
Anhydride-24
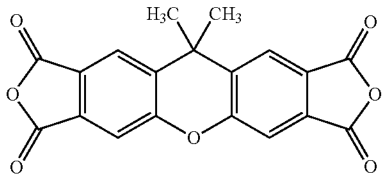

-continued
Anhydride-25
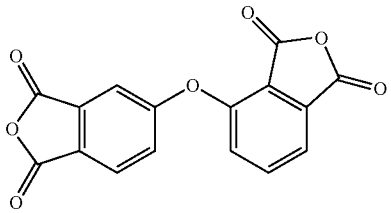
Anhydride-26
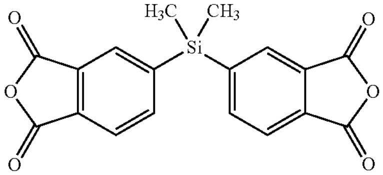
Anhydride-27
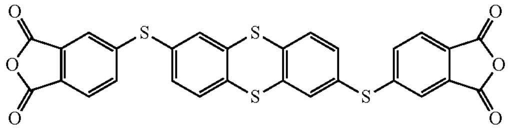
Anhydride-28
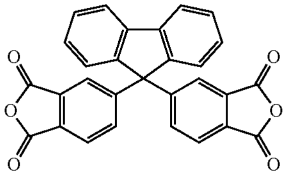
Anhydride-29
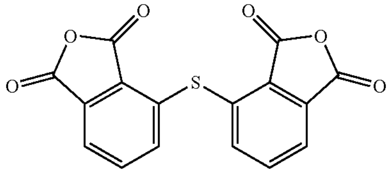
Anhydride-30
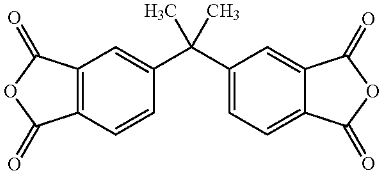
Anhydride-31
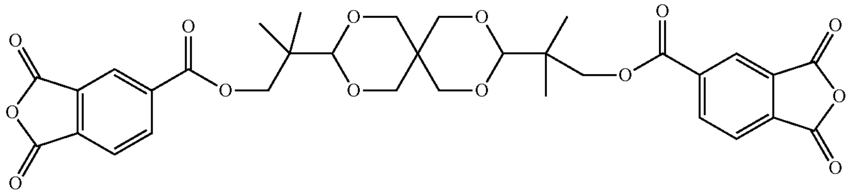
Anhydride-32
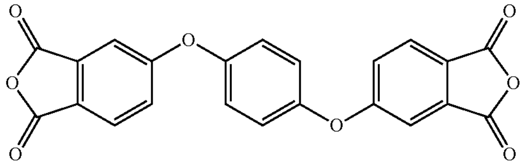
Anhydride-33
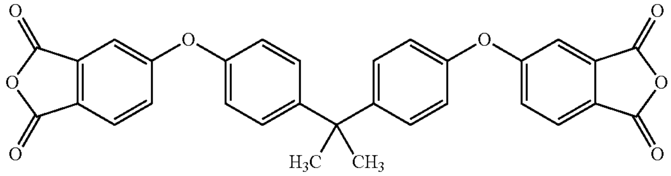
Anhydride-34
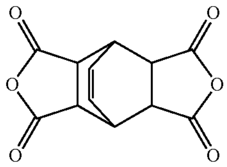
Anhydride-35
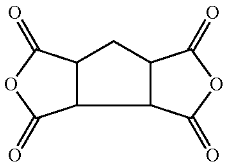
Anhydride-36
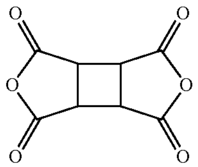
Anhydride-37
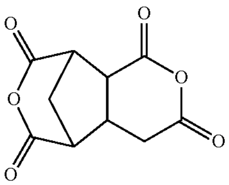

-continued
Anhydride-38
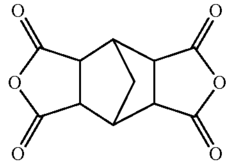
Anhydride-39
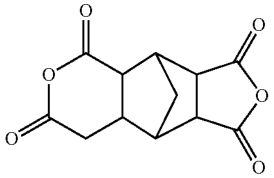
Anhydride-40
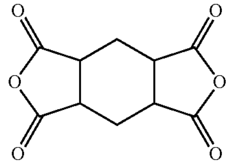
Further, specific examples of general diamine compounds are shown below.
Diamine-1
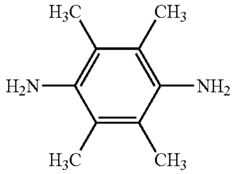
Diamine-2
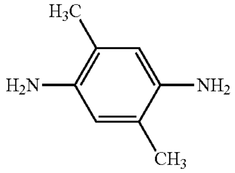
Diamine-3
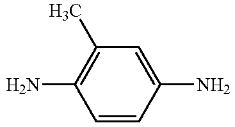
Diamine-4
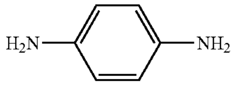
Diamine-5
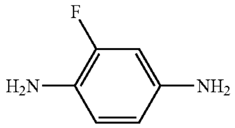
Diamine-6
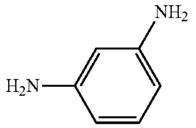
Diamine-7
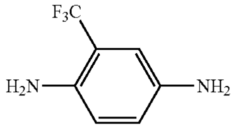
-continued
Diamine-8
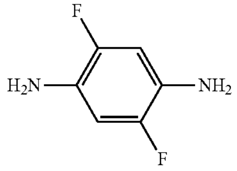
Diamine-9
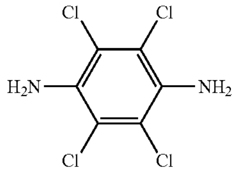
Diamine-10
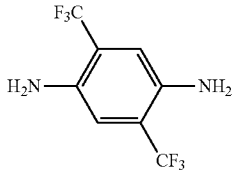
Diamine-11
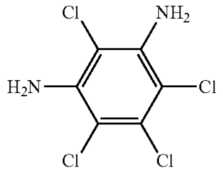
Diamine-12
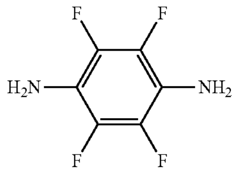
Diamine-13
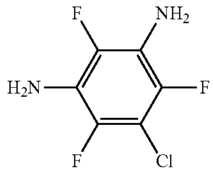

-continued
Diamine-14
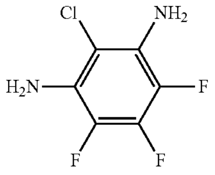
Diamine-15
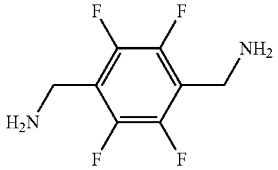
Diamine-16
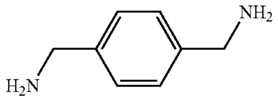
Diamine-17
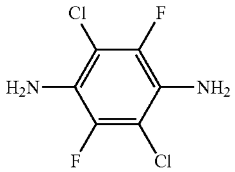
Diamine-18
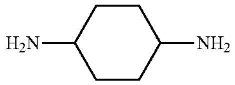
Diamine-19
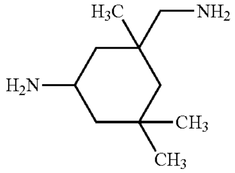
Diamine-20
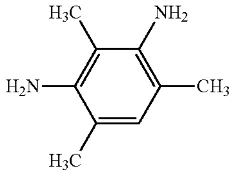
Diamine-31
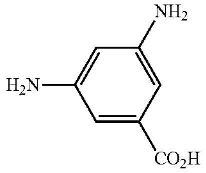
Diamine-32
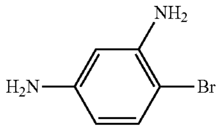
Diamine-33
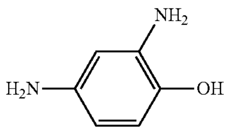
-continued
Diamine-34
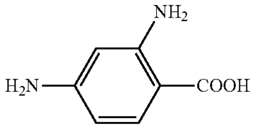
Diamine-35
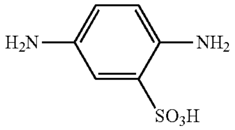
Diamine-36
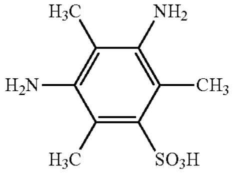
Diamine-37
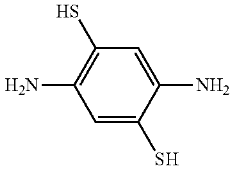
Diamine-38
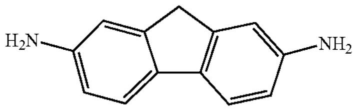
Diamine-39
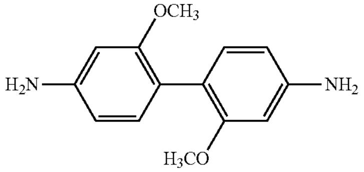
Diamine-40
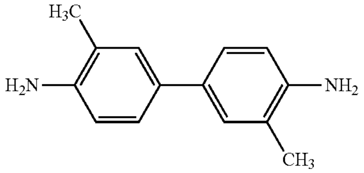
Diamine-41
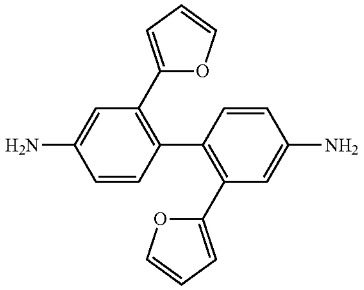
Diamine-42
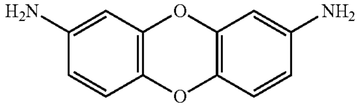

-continued
Diamine-43
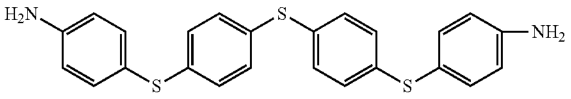
Diamine-44
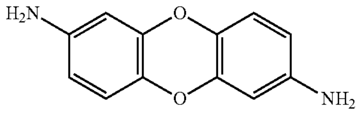
Diamine-45
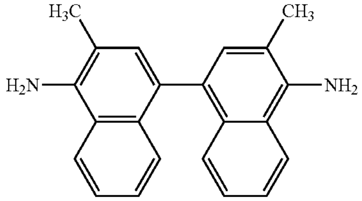
Diamine-46
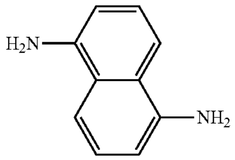
Diamine-47
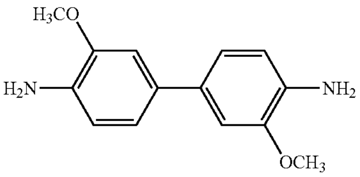
Diamine-48
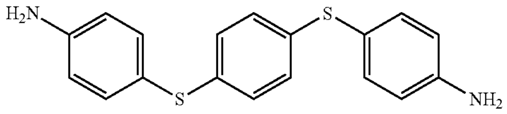
Diamine-49
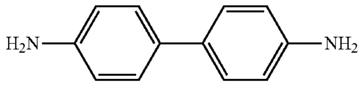
Diamine-50
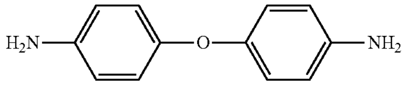
Diamine-51
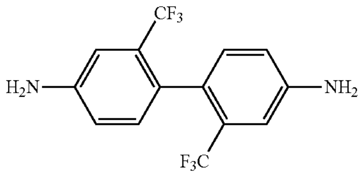
Diamine-52
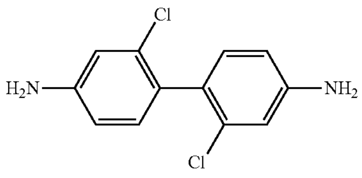
-continued
Diamine-53
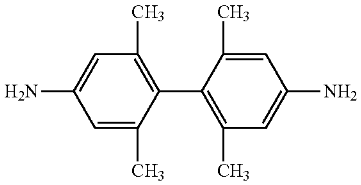
Diamine-54
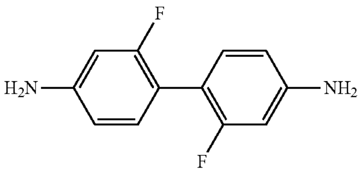
Diamine-55
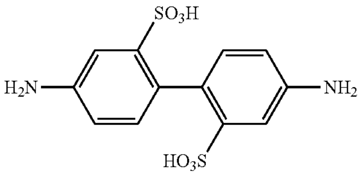
Diamine-56
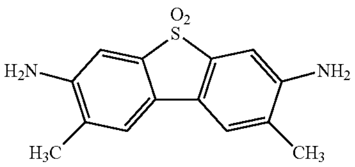
Diamine-57
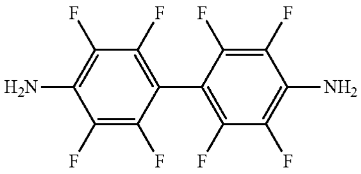
Diamine-58
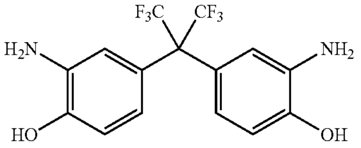
Diamine-59
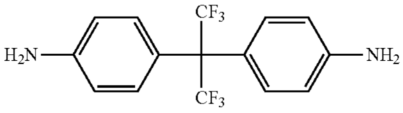
Diamine-60
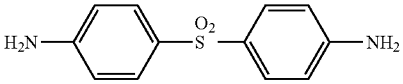
Diamine-61
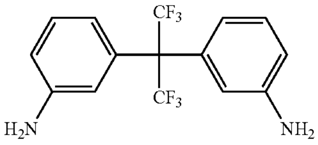
Diamine-62
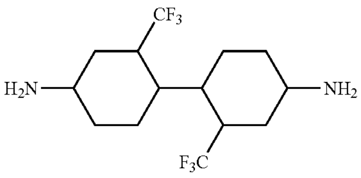

-continued

Diamine-63

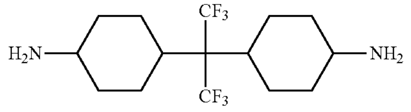

Diamine-64

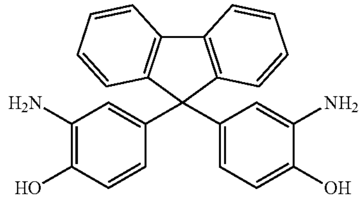

Diamine-65

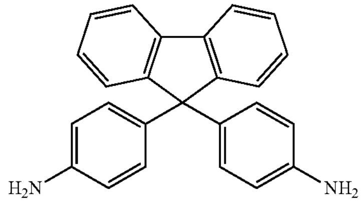

Diamine-66

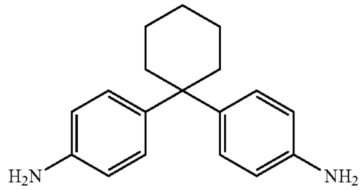

Diamine-67

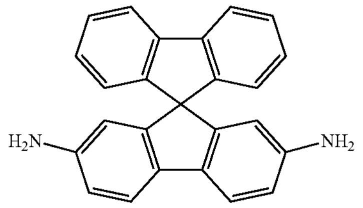

Diamine-68

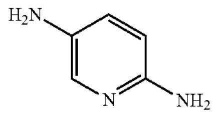

Diamine-69

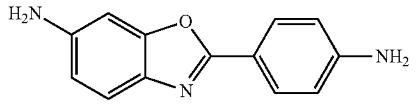

Diamine-70

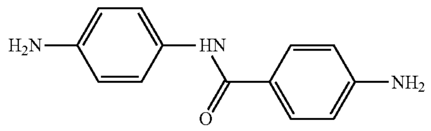

In the present invention, a ratio of copolymerization ($R_I$) of a constitutional unit of Formula (I), a ratio of copolymerization ($R_{II}$) of a constitutional unit of Formulas (II-a) and (II-b), and a ratio of copolymerization ($R_{III}$) of a constitutional unit of Formulas (III-a) and (III-b) are not particularly limited, but are preferably as described below.

| | Preferred range | More preferred range | Particularly preferred range |
|---|---|---|---|
| $R_{II}$ | from 0 to 90 mol % | from 0 to 80 mol % | from 0 to 60 mol % |
| $R_{III}$ | from 0.01 to 17 mol % | from 0.1 to 10 mol % | from 1 to 10 mol % |
| $R_{IV}$* | from 0.01 to 90 mol % | from 0.1 to 90 mol % | from 1 to 90 mol % |

Note:
$R_{IV}$ with a symbol * is a ratio of copolymerization of any other constitutional unit, provided that an expression: $R_I = R_{II} + R_{III} + R_{IV}$ should be satisfied in each preferred range of $R_I$, $R_{II}$, $R_{III}$, and $R_{IV}$.

Next, with regard to the crosslinked polyimide membrane for use in the present invention, the polymer containing the crosslinkable group may be used alone, or in combination with another reaction agent (preferably crosslinking agent), thereby forming the above-described crosslinking chain.

Preferred specific examples of the crosslinking agent are shown below, but the present invention is not limited thereto.

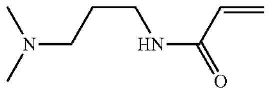

M-1

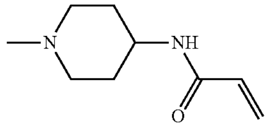

M-2

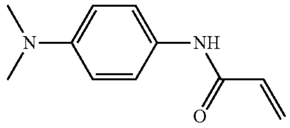

M-3

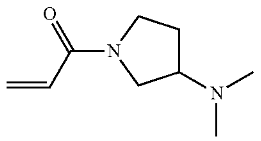

M-4

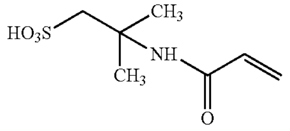

M-5

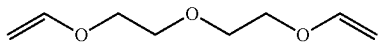

M-6

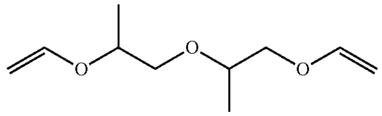

M-7

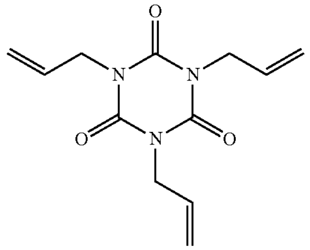

M-8

-continued

M-9

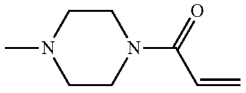

M-10

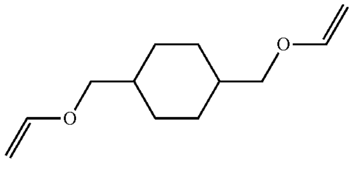

M-11

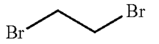

M-12

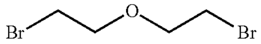

M-13

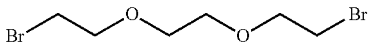

M-14

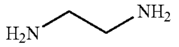

M-15

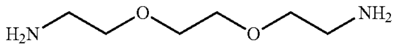

The gas separation membrane according to the present invention can be formed by hardening with provision of some sort of energy, such as heat and light.

As a monomer corresponding to partial structure represented by Formula (I), (II-a) or (II-b), one processed into an oligomer or a prepolymer may be used. The polymer for use in the present invention may be a copolymer having any form, such as a block copolymer, a random copolymer or a graft copolymer. In particular, a case where a block copolymer or a graft copolymer is used is preferred from viewpoints of viscosity and compatibility.

A ratio of partial structure represented by the above-described Formula (I), (II-a) or (II-b) is not particularly defined. As a composition ratio of partial structure having a plurality of crosslinked structures increases, although an influence of molecular structure is significant, strength of a membrane and separation selectivity are generally improved but gas permeability tends to decrease. Therefore, as the composition ratio, the range of from 1 to 50% by mass, and preferably from 5 to 30% by mass is applied as a criterion, respectively. However, the composition ratio is not limited to these ranges, and the composition ratio is changed according to the purpose of gas separation (a recovery ratio, purity or the like), and thus gas permeability and separation selectivity are adjusted.

The molecular weight of the above-described polyimide compound is not particularly limited because of a crosslinked membrane. The molecular weight corresponding to each partial structure is preferably, as the mass average molecular weight, from 1,000 to 1,000,000, more preferably from 5,000 to 500,000, and further preferably from 5,000 to 300,000.

Unless it is explicitly stated otherwise, the molecular weight and the degree of dispersion are defined as the values obtained by measurement in accordance with a GPC (Gel Permeation Chromatography). The molecular weight is defined as polystyrene-converted mass-average molecular weight.

The gel charged into the column used in the GPC method is preferably a gel having an aromatic compound as a repeating unit, and examples thereof include a gel made of styrene-divinylbenzene copolymers. The column is preferably used in the form where 2 to 6 columns are connected. Examples of a solvent used include ether-based solvents such as tetrahydrofuran, and amide-based solvents such as N-methylpyrrolidinone. The measurement is preferably carried out at a flow rate of the solvent in the range of from 0.1 to 2 mL/min, and most preferably in the range of from 0.5 to 1.5 mL/min. By carrying out the measurement within these ranges, there is no occurrence of loading in an apparatus, and thus, the measurement can be carried out further efficiently. The measurement temperature is preferably carried out at from 10° C. to 50° C., and most preferably from 20° C. to 40° C. A column and a carrier to be used can be properly selected, according to the property of a polymer compound to be measured.

[Crosslinked Polyimide Resin]

(Crosslinked Site Ratio [η])

In the present invention, a ratio [η] of a crosslinked site to an imide group of the above-described polyimide compound (the number of crosslinked sites/the number of imide groups) in the above-described crosslinked polyimide resin is from 0.0001 to 0.45, preferably from 0.01 to 0.3, more preferably from 0.01 to 0.2, and further preferably from 0.01 to 0.1. Further, when the ratio is set to a low crosslinked site ratio, the ratio is preferably 0.05 or less, more preferably 0.04 or less, and particularly preferably 0.02 or less.

"Crosslinked site ratio [η]" herein is based on the number of crosslinked crosslinkable functional groups, and expressed in terms of a calculated value (ratio) from which the number of uncrosslinked crosslinkable functional groups is excluded, even when any crosslinkable functional group is introduced into the polyimide compound. Adjustment of this value to the above-described lower limit or more allows minimization of a decrease in separation selectivity under high $CO_2$ concentration conditions or in association with plasticizing of the membrane under the influence of an aromatic compound such as benzene, toluene and xylem contained in a natural gas, or hydrocarbon impurities such as hexane and heptane contained therein. Adjustment of this value to the above-described upper limit or less allows minimization of a decrease in gas permeability in association with an improvement of crosslinked density, and also an improvement of a crack or mechanical strength such as brittleness during bending.

Adjustment of this crosslinked site ratio to a desired range can be performed by appropriately adjusting, during a synthesis of the polyimide compound, an existence ratio of a crosslinkable functional group (for example, later-mentioned crosslinkable functional group density [γ]) or a crosslinking conversion ratio (for example, a ratio of the number of crosslinked functional groups based on the gross number of crosslinkable functional groups (crosslinking conversion ratio) [α]) by changing crosslinking reaction conditions, and according to a calculation, an expression: $[\eta]=[\gamma]\times[\alpha]/200$ is satisfied. Specifically, the crosslinked site ratio [η] can be improved by increasing a composition ratio of a monomer having a crosslinkable site in a predetermined range, enhancing reactivity, achieving polyfunctionality, or using a raw material having another crosslinkable substituent in combination.

(Crosslinkable Functional Group Density [γ])

A ratio of the number of functional groups $L^2$ of Formulas (III-a) and (III-b) to the repeating unit represented by Formula (I) is referred to as crosslinkable functional group density [γ]. A preferred range of this γ (the number of functional groups $L^2$'s/the number of repeating units represented by Formula (I)) is from 0.003 to 0.68, and a further preferred range is from 0.003 to 0.56.

This crosslinkable functional group density can be adjusted by an amount of charging a substrate (monomer) on synthesizing the polyimide compound.

(Crosslinking Conversion Ratio [α])

The crosslinking conversion ratio [α] in the present invention can be calculated by a decrease of peaks of double bond sites (1640, 810 $cm^{-1}$) before and after crosslinking in reflective infrared spectroscopy measurement of the membrane and a decrease of peaks of double bonds before and after crosslinking in $^{1}H$-NMR. The crosslinking conversion ratio is preferably 20% or more and 100% or less, more preferably 50% or more and 94% or less, and further preferably 30% or more and 89% or less.

This crosslinking conversion ratio can be adjusted by conditions of crosslinking the polyimide compound, for example, by adjusting a kind of a radical polymerization initiator, temperature in the crosslinking reaction, a substrate concentration, an amount of heat, and an amount of light and irradiation time of active radiation. Specific examples include, in order to enhance a rate of reaction in the crosslinking reaction in radical polymerization, increasing gross energy of heat or light energy, and for a material, improving activity of a photoinitiator (e.g., a ketone-based compound) or a thermal initiator (e.g., a compound having a low decomposition temperature for an azo compound), each being a polymerization initiator.

[Method of Producing Gas Separation Composite Membrane]

The method of producing a gas separation composite membrane according to the present invention preferably includes a production method by which a membrane is formed by coating a coating liquid containing the above-described polyimide compound onto a support, and irradiating the resultant coated membrane with active radiation. The component composition of the coating liquid (dope) for constituting the coated membrane is not particularly limited, but preferably contains the above-described polyimide compound and a polymerization initiator in an organic solvent. The content of the polyimide compound is not particularly limited, but the compound is contained in the coating liquid in an amount of preferably from 0.1 to 30% by mass, and further preferably from 1 to 10% by mass. Adjustment of the content to the above-described lower limit or more causes, when the concentration is weak, an increase in possibility of producing a defect on a surface layer contributing to separation due to easy permeation into a lower layer upon forming the membrane on the porous support. Adjustment of the content to the above-described upper limit or lower allows minimization of a phenomenon of thin layer formation or a decrease in permeability as caused by being packed in pores with high concentration upon forming the membrane on the porous support in the case of a high concentration. The gas separation composite membrane according to the present invention can be suitably produced by adjusting the molecular weight, structure and the composition of the polymer in the separating layer, and also solution viscosity of the polymer.

[Organic Solvent]

The organic solvent is not particularly limited, and specific examples include hydrocarbon-based organic solvents such as n-hexane and n-heptane; ester-based organic solvents such as methyl acetate, ethyl acetate, and butyl acetate; lower alcohols such as methanol, ethanol, n-propanol, isopropanol, n-butanol, isobutanol and tert-butanol; aliphatic ketones such as acetone, methyl ethyl ketone, methyl isobutyl ketone, diacetone alcohol, cyclopentanone, and cyclohexanone; ether-based organic solvents such as ethylene glycol, diethylene glycol, triethylene glycol, glycerin, propylene glycol, ethylene glycol monomethyl or monoethyl ether, propylene glycol methyl ether, dipropylene glycol methyl ether, tripropylene glycol methyl ether, ethylene glycol phenyl ether, propylene glycol phenyl ether, diethylene glycol monomethyl or monoethyl ether, diethylene glycol monobutyl ether, triethylene glycol monomethyl or monoethyl ether, dibutyl ether, tetrahydrofuran, methyl cyclopentyl ether, and dioxane; N-methylpyrrolidone, 2-pyrrolidone, dimethylformamide, dimethyl imidazolidinone, dimethyl sulfoxide, dimethyl acetamide and the like. These organic solvents are suitably selected within the range in which the solvents do not exert a harmful influence, such as corrosion of the support, and preferably an ester-based solvent (preferably butyl acetate), an alcohol-based solvent (preferably methanol, ethanol, isopropanol, and isobutanol), aliphatic ketones (preferably methyl ethyl ketone, methyl isobutyl ketone, diacetone alcohol, cyclopentanone, and cyclohexanone) or an ether-based solvent (e.g., ethylene glycol, diethylene glycol monomethyl ether, and methyl cyclopentylether); and further preferably an aliphatic ketone-based solvent, an alcohol-based solvent or an ether-based solvent. These compounds may be used alone or in combination of two or more types.

The gas separation composite membrane of the present invention preferably contains the later-mentioned polymerization initiator and is formed by hardening by irradiation with active radiation. Here, the active radiation is not particularly limited so long as it produces energy capable of generating initiation species in the membrane composition when irradiated and broadly includes α-ray, γ-ray, X-rays, ultraviolet rays, visible rays, electric beams and the like. Of these, ultraviolet rays and electric beams are preferred and ultraviolet rays are particularly preferred, in terms of curing sensitivity and easy availability of apparatuses.

When ultraviolet rays are used in the present invention, addition of the following photopolymerization initiator is necessary. Electric beam curing is preferred since a polymerization initiator is unnecessary and a permeation depth is large. An electric beam accelerator may utilize a scanning manner, a double scanning manner or a curtain beam manner and is preferably a curtain beam manner capable of obtaining high power at a relatively low cost. Regarding properties of electric beam, an acceleration voltage is from 30 to 1000 kV, preferably from 50 to 300 kV. An absorbed dose is preferably from 5 to 200 kGy (from 0.5 to 20 Mrad), more preferably from 20 to 100 kGy (from 2 to 10 Mrad). When the acceleration voltage and absorbed dose are within these ranges, a sufficient amount of energy is permeated and energy efficiency is thus good. Regarding the atmosphere, at which an electric beam is irradiated, an oxygen concentration is preferably 200 ppm or less under a nitrogen atmosphere. Within this range, cross-linkage and curing are well performed around the surface.

A mercury lamp is used as a light source of ultraviolet rays. The mercury lamp utilizes a lamp of from 20 to 240 $W/cm^2$ and is used at a speed of from 0.3 to 20 m/min. The distance between the membrane and the mercury lamp is preferably generally from 1 to 30 cm. When a desktop-type ultraviolet ray curing apparatus is used, curing is preferably performed after suitably controlling light amount and position of light source according to the material and environments for from about 1 second to about 10 minutes.

Known radiation curing apparatuses, conditions and the like described in "UV-EB curing techniques" (issued by Technical Integration Center, Corp.) or "Application techniques of low-energy electric beam irradiation" (2000, issued by CMC Co., Ltd.) and the like may be used. Curing may be carried out in conjunction with heating.

[Polymerization Initiator]

In the process of forming the gas separation composite membrane of the present invention, a radical polymerization initiator is preferably added and a photopolymerization initiator is particularly preferably added.

The photopolymerization initiator is a compound that causes chemical reaction via action of light or interaction with a sensitizing dye in an electron-excited state and thus produces at least one kind of radicals, acid and base, preferably a polymerization initiator that produces radicals or acid via action of light.

The photopolymerization initiator may be appropriately selected from those having a sensitivity with respect to irradiated active radiation such as ultraviolet rays of from 400 to 200 nm, far ultraviolet rays, g-rays, h-rays, i-rays, KrF excimer laser beam, ArF excimer laser beam, electron beam, X-rays, molecular beam or ion beam.

Specifically, the photopolymerization initiator may be selected from those known to those skilled in the art without limitation and specific examples thereof include the compounds described in Bruce M. Monroe et al., Chemical Review, 93, 435 (1993), R. S, Davidson, Journal of Photochemistry and biology A: Chemistry, 73, 81 (1993), J. P. Faussier, "Photonitiated Polymerization—Theory and Applications": Rapra Review Vol. 9, Report, Rapra Technology (1998), and M. Tsunooka et al., Prog. Polym. Sci., 21, 1 (1996). It is also possible to use the compounds for chemically amplified photosists or photocation polymerization described in "Organic Materials for Imaging", edited by the Japanese Research Association for Organic Electronics Materials, published by Bunshin Design Printing Publishing and Digital Communications (1993), pp. 187-192. Further, compounds that cause bond cleavage in oxidative or reductive manner via interaction with a sensitizing dye in an electron-excited state are also known, such as those described in F. D. Saeva, Topics in Current Chemistry, 156, 59 (1990), G. G. Maslak, Topics in Current Chemistry, 168, 1 (1993), H. B. Shuster et al., J. Am. Chem. Soc., 112, 6329 (1990), and I. D. F. Eaton et al., J. Am. Chem. Soc., 102, 3298 (1980).

Preferred examples of the photopolymerization initiator include (a) aromatic ketones, (b) aromatic onium salt compounds, (c) organic peroxides, (d) hexaaryl biimidazole compounds, (e) ketoxime ester compounds, (f) borate compounds, (g) azinium compounds, (h) metallocene compounds, (i) active ester compounds, and (j) compounds having a carbon-halogen bond.

Preferred examples of the (a) aromatic ketones include the compounds having a benzophenone skeleton or a thioxanthone skeleton described in J. P. Fouassier and J. F. Rabek, "Radiation Curing in Polymer Science and Technology" (1993), pp. 77-117. More preferred examples of the (a) aromatic ketones include α-thiobenzophenone compounds described in JP-B-47-6416 ("JP-B" means examined Japanese patent publication), benzoin ether compounds described in JP-B-47-3981, α-substituted benzoin compounds described in JP-B-47-22326, benzoin derivatives described in JP-B-47-23664, aroyl phosphonates described in JP-A-57-30704, dialkoxybenzophenones described in JP-B-60-26483, benzoin ethers described in JP-B-60-26403 and JP-A-62-81345, α-aminobenzophenones described in JP-B-1-34242, U.S. Pat. No. 4,318,791 and EP 0284561 A1, p-di(dimethylaminobenzoyl)benzenes described in JP-A-2-211452, thio-substituted aromatic ketones described in JP-A-61-194062, acylphosphinesulfide described in JP-B-2-9597, acylphosphine described in JP-B-2-9596, thioxanthones described in JP-B-63-61950, and coumarins described in JP-B-59-42864.

The (b) aromatic omium salts include aromatic omium salts of elements of Groups V, VI and VII of the periodic table, and more specifically, N, P, As, Sb, Bi, O, S, Se, Te or I. Preferred examples of the (b) aromatic omium salts include: iodonium salts described in European Patent No. 104143, U.S. Pat. No. 4,837,124, JP-A-2-150848 and JP-A-2-96514; sulfonium salts described in European Patent No. 370693, European Patent No. 233567, European Patent No. 297443, European Patent No. 297442, European Patent No. 279210, European Patent No. 422570, U.S. Pat. Nos. 3,902,144, 4,933,377, 4,760,013, 4,734,444 and 2,833,827; diazonium salts (such as benzene diazonium which may contain a substituent); resins of diazonium salts (such as formaldehyde resins of diazo diphenylamine); N-alkoxy pyrridium salts (such as those described in U.S. Pat. No. 4,743,528, JP-A-63-138345, JP-A-63-142345, JP-A-63-142346 and JP-B-46-42363, and more specifically 1-methoxy-4-phenyl pyrridium tetrafluoroborate); and compounds described in JP-B-52-147277, JP-B-52-14278 and JP-B-52-14279. These salts produce radicals or acids as the active species.

The (c) "organic peroxides" described above include almost all organic compounds having one or more oxygen-oxygen bonds in the molecule, and preferred examples thereof include peroxide esters such as 3,3',4,4'-tetra-(t-butylperoxycarbonyl)benzophenone, 3,3',4,4'-tetra-(t-amylperoxycarbonyl)benzophenone, 3,3',4,4'-tetra-(t-hexylperoxycarbonyl)benzophenone, 3,3',4,4'-tetra-(t-octylperoxycarbonyl)benzophenone, 3,3',4,4'-tetra-(cumylperoxycarbonyl)benzophenone, 3,3',4,4'-tetra-(p-isopropylcumylperoxycarbonyl)benzophenone, and di-t-butyl di-peroxy isophthalate.

Examples of the (d) hexaaryl biimidazoles mentioned above include lophine dimers described in JP-B-45-37377 and JP-B-44-86516, such as 2,2'-bis(o-chlorophenyl)-4,4',5,5'-tetraphenyl biimidazole, 2,2'-bis(o-bromophenyl)-4,4',5,5'-tetraphenyl biimidazole, 2,2'-bis(o,p-dichloro-phenyl)-4,4',5,5'-tetraphenyl biimidazole, 2,2'-bis(o-chlorophenyl)-4,4',5,5'-tetra-(m-methoxyphenyl)biimidazole, 2,2'-bis(o,o'-dichloro-phenyl)-4,4',5,5'-tetraphenyl biimidazole, 2,2'-bis(o-nitrophenyl)-4,4',5,5'-tetraphenyl biimidazole, 2,2'-bis(o-methyl-phenyl)-4,4',5,5'-tetraphenyl biimidazole, and 2,2'-bis(o-trifluoro-phenyl)-4,4',5,5'-tetraphenyl biimidazole.

Examples of the (e) ketoxium esters include 3-benzoyloxy-iminobutan-2-one, 3-acetoxy-iminobutan-2-one, 3-propionyloxy-iminobutan-2-one, 2-acetoxy-iminopentan-3-one, 2-acetoxyimino-1-phenylpropan-1-one, 2-benzoyloxy-imino-1-phenylpropan-1-one, 3-p-toluene sulfonyloxy iminobutan-2-one, and 2-ethoxycarbonyl oxyimino-1-phenylpropan-1-one.

Examples of the (f) borate salts include the compounds described in U.S. Pat. Nos. 3,567,453, 4,343,891, European Patent No. 109772 and European Patent No. 109773.

Examples of the (g) azinium salt compounds include compounds having N—O bond described in JP-A-63-138345, JP-A-63-142345, JP-A-63-142346, JP-A-63-143537 and JP-B-46-42363.

Examples of the (h) metallocene compounds include titanocene compounds as described in JP-A-59-152396, JP-A-61-151197, JP-A-63-41484, JP-A-2-249, and JP-A-2-4705, and iron-arene complexes described in JP-A-1-304453 and JP-A-1-152109.

Specific examples of the aforementioned titanocene compound include di-cyclopentadienyl-Ti-di-chloride, di-cyclopentadienyl-Ti-bis-phenyl, di-cyclopentadienyl-Ti-bis-2,3,4,5,6-pentafluorophen-1-yl, di-cyclopentadienyl-Ti-bis-2,3,5,6-tetrafluorophen-1-yl, di-cyclopentadienyl-Ti-bis-2,4,6-trifluorophen-1-yl, di-cyclopentadienyl-Ti-bis-2,6-di-fluorophen-1-yl, di-cyclopentadienyl-Ti-bis-2,4-di-fluorophen-1-yl, di-methyl-cyclopentadienyl-Ti-bis-2,3,4,5,6-pentafluorophen-1-yl, di-methyl-cyclopentadienyl-Ti-bis-2,3,5,6-tetrafluorophen-1-yl, di-methyl-cyclopentadienyl- Ti-bis-2,4-difluorophen-1-yl, bis(cyclopentadienyl)-bis(2,6-difluoro-3-(pyr-1-yl)phenyl)titanium, bis(cyclopentadienyl) bis[2,6-difluoro-3-(methyl-sulfonamide)phenyl]titanium, and bis(cyclopentadienyl)bis[2,6-difluoro-3-(N-butyl biaroyl-amino)phenyl]titanium.

Examples of the (i) active ester compounds include nitrobenzyl ester compounds described in European Patent No. 0290750, European Patent No. 046083, European Patent No. 156153, European Patent No. 271851, European Patent No. 0388343, U.S. Pat. Nos. 3,901,710, 4,181,531, JP-A-60-198538, and JP-A-53-133022; iminosulfonate compounds described in European Patent No. 0199672, European Patent No. 84515, European Patent No. 199672, European Patent No. 044115, European Patent No. 0101122, U.S. Pat. Nos. 4,618,564, 4,371,605, 4,431,774, JP-A-64-18143, JP-A-2-245756, and JP-A-4-365048; and compounds described in JP-B-62-6223, JP-B-63-14340 and JP-A-59-174831.

Examples of the (j) compounds containing a carbon-halogen bond include a compound as described by Wakabayashi, et al., in Bull. Chem. Soc. Japan, 42, 2924 (1969), a compound described in GB Patent No. 1388492, a compound described in JP-A-53-133428, and a compound as described in German Patent No. 3337024.

Other examples include a compound described by F. C. Schaefer, et. al., in J. Org. Chem., 29, 1527 (1964), a compound described in JP-A-62-58241, and a compound described in JP-A-5-281728. Other examples include a compound described in German Patent No. 2641100, a compound described in German Patent No. 3333450, a group of compounds described in German Patent No. 3021590, and a group of compounds described in German Patent 3021599.

The amount of used polymerization initiator is preferably from 0.01 mass part to 10 mass parts, more preferably from 0.1 mass part to 5 mass parts, based on 1 mass part of the polymerizable compound.

[Cosensitizer]

A known compound having a function of further improving sensitivity or suppressing polymerization inhibition due to oxygen may be added as a cosensitizer in the process of producing the gas separation composite membrane of the present invention.

Examples of such a cosensitizer include amines such as the compounds described in M. R. Sander et al., "Journal of Polymer Society", Vol. 10, p. 3173 (1972), JP-B-44-20189, JP-A-51-82102, JP-A-52-134692, JP-A-59-138205, JP-A-60-84305, JP-A-62-18537, JP-A-64-33104 and Research Disclosure Vol. 33825. Specific examples include triethanolamine, ethyl p-dimethylaminobenzoate, p-formyldimethylaniline and p-methylthiodimethylaniline.

Examples of other cosensitizers include thiols and sulfides, such as thiol compounds described in JP-A-53-702, JP-B-55-500806 and JP-A-5-142772 and disulfide compounds described in JP-A-56-75643. Specific examples include 2-mercaptobenzothiazole, 2-mercaptobenzoxazole, 2-mercaptobenzimidazole, 2-mercapto-4(3H)-quinazoline, and β-mercaptonaphthalene.

Other examples of the cosensitizer include amino acid compounds (such as N-phenylglycine), organic metal compounds (such as tributyltin acetate) described in JP-B-48-42965, hydrogen donors described in JP-B-55-34414, sulfur compounds (such as trithian) described in JP-A-6-308727, phosphorous compounds (such as diethyl phosphite) described in JP-A-6-250387, and Si—H and Ge—H compounds described in JP-A-8-65779.

[Other Components and the Like]

The gas separation composite membrane of the present invention may contain a variety of polymer compounds in order to adjust membrane physical properties. Examples of the polymer compounds include acryl-based polymers, polyurethane resins, polyamide resins, polyester resins, epoxy resins, phenol resins, polycarbonate resins, polyvinyl butyral resins, polyvinyl formal resins, shelac, vinyl-based resins, acryl-based resins, rubber-based resins, waxes, and other natural resins. These resins may be used alone or in combination of two or more kinds thereof.

Moreover, a nonionic surfactant, a cationic surfactant, an organic fluoro surfactant or the like may be added in order to adjust liquid physical properties.

Specific examples of the surfactant include anionic surfactants such as alkylbenzene sulfonates, alkyl naphthalene sulfonates, higher fatty acid salts, sulfonates of a higher fatty acid ester, ester sulfates of a higher alcohol ether, sulfonates of a higher alcohol ether, alkylcarboxylates of a higher alkylsulfone amide, and alkylphosphates; and nonionic surfactants such as polyoxyethylene alkyl ethers, polyoxyethylene alkyl phenyl ethers, polyoxyethylene fatty acid esters, sorbitan fatty acid esters, ethylene oxide adducts of acetylene glycol, ethylene oxide adducts of glycerin, and polyoxyethylene sorbitan fatty acid esters. Other examples include amphoteric surfactants such as alkyl betaine or amide betaine, silicone-based surfactants, fluorine-based surfactants and the like. The surfactant may be suitably selected from conventionally known surfactants and derivatives thereof.

Specific examples of polymer dispersants include polyvinyl pyrrolidone, polyvinyl alcohol, polyvinyl methylether, polyethylene oxide, polyethylene glycol, polypropylene glycol, and polyacryl amide. Among them, polyvinyl pyrrolidone is preferably used.

The conditions to form the gas separation composite membrane of the present invention are not particularly limited, but the temperature is preferably from −30° C. to 100° C., more preferably from −10° C. to 80° C., and particularly preferably from 5° C. to 50° C.

In the present invention, gas such as air or oxygen may coexist during formation of membrane, but the formation is preferably performed under an inert gas atmosphere.

Moreover, an organic solvent may be added as a medium used for forming the gas separation composite membrane of the present invention. Specifically, organic solvents to be used are not particularly limited, but examples include hydrocarbon-based organic solvents such as n-hexane and n-heptane; ester-based organic solvents such as methyl acetate, ethyl acetate, and butyl acetate; lower alcohols such as methanol, ethanol, n-propanol, isopropanol, n-butanol, isobutanol and tert-butanol; aliphatic ketones such as acetone, methyl ethyl ketone, methyl isobutyl ketone and diacetone alcohol; ether-based organic solvents such as ethylene glycol, diethylene glycol, triethylene glycol, glycerin, propylene glycol, ethylene glycol monomethyl or monoethyl ether, propylene glycol methyl ether, dipropylene glycol methyl ether, tripropylene glycol methyl ether, ethylene glycol phenyl ether, propylene glycol phenyl ether, diethylene glycol monomethyl or monoethyl ether, diethylene glycol monobutyl ether, triethylene glycol monomethyl or monoethyl ether, dibutyl ether and tetrahydrofuran; N-methylpyrrolidone, 2-pyrrolidone, dimethylformamide, dimethyl imidazolidinone, dimethyl sulfoxide, dimethyl acetamide and the like. These compounds may be used alone or in combination of two or more types.

The membrane thickness of the gas separation composite membrane of the present invention is preferably from 0.01 to 100 μm, more preferably from 0.1 to 10 μm.

[Method of Separating Gas Mixture]

The method of separating a gas mixture according to the present invention is a method of separating at least one acid gas from a mixed gas containing the at least one acid gas. The acid gas that can be separated by using the gas separation composite membrane of the present invention is preferably carbon dioxide or hydrogen sulfide.

In the method of separating gas using the gas separation composite membrane of the present invention, the components of gas mixture of raw materials are not particularly restricted, but main components of the gas mixture are preferably carbon dioxide and methane or carbon dioxide and hydrogen. When the gas mixture is present together with an acid gas such as carbon dioxide or hydrogen sulfide, a method of separating gas using the gas separation membrane of the present invention exerts considerably superior performance, preferably exerts superior performance for separation of carbon dioxide and hydrocarbon such as methane, carbon dioxide and nitrogen, or carbon dioxide and hydrogen.

[Gas Separation Membrane Module and Gas Separation Apparatus]

The gas separation membrane of the present invention is a composite membrane using a porous support in combination, and a gas separation membrane module using the same is preferred. Moreover, an apparatus for gas separation having means for separating and recovering or separating and purifying gas can be obtained by using the gas separation composite membrane or gas separation membrane module of the present invention.

The gas separation composite membrane of the present invention is preferably used in the form of a module. Examples of the module include spiral, hollow, pleat, tubular, and plate and frame types. Moreover, the gas separation composite membrane of the present invention may be applied to an apparatus for separating and recovering gas using a membrane/absorption hybrid method in conjunction with an absorption solution, for example, as described in JP-A-2007-297605.

The gas separating composite membrane according to the present invention having the above-described excellent properties can be preferably used for a gas separation recovery method or a gas separation purification method. For example, the gas separating composite membrane can be processed into a gas separation membrane that can efficiently separate a specific gas from a gaseous mixture containing a gas of hydrogen, helium, carbon monoxide, carbon dioxide, hydrogen sulfide, oxygen, nitrogen, ammonia, sulfur oxide, nitrogen oxide, a hydrocarbon such as methane and ethane, an unsaturated hydrocarbon such as propylene, or a perfluoro compound such as tetrafluoroethane. In particular, the gas separation composite membrane according to the present invention is preferably used in a gas separation membrane for selectively separating carbon dioxide from the gaseous mixture containing carbon dioxide/hydrocarbon (methane), and various kinds of modules or gas separation apparatus having excellent performance can be prepared using this separation membrane. Moreover, the gas separation membrane according to the present invention facilitates production of a gas separation composite membrane having excellent performance due to formation of few pinholes.

Above all, a gas to be supplied is preferably a mixed gas of carbon dioxide and methane, a transmission rate of carbon dioxide at 40° C. and 5 atmospheric pressure is preferably more than 20 GPU, more preferably from 20 to 300 GPU. A ratio of transmission rates ($TR_{CO2}/TR_{CH4}$) of carbon dioxide and methane is preferably 20 or more, more preferably from 20 to 50.

To the above-described selective gas permeation, consideration is made to the role of the dissolution and diffusion mechanism to the membrane as mentioned above. Study has been made for a separation membrane containing a polyethyleneoxy (PEO) composition by taking an advantage of such a viewpoint (see Journal of Membrane Science, 1999, 160, 87-99). This results from strong interaction of carbon dioxide with the polyethyleneoxy composition. This polyethyleneoxy membrane is a flexible and rubbery polymer membrane having a low glass transition temperature, and therefore a difference of diffusion coefficients depending on gas species is small, and separation selectivity is mainly caused due to an effect of a difference in solubility. On the other hand, according to the present invention, a glass transition temperature of the polyimide compound applied herein is high, and while the above-described dissolution and diffusion action is developed, thermal durability of the membrane can also be significantly improved.

EXAMPLES

Hereinafter, the present invention will be described in more detail with reference to examples, but the present invention is not limited to these examples. In addition, "part" and "%" is based on mass, unless otherwise particularly described.

Synthesis Examples

<Synthesis of Monomers (M-2), (M-3) and (M-9)>

The monomers (M-2) and (M-3) were synthesized, in accordance with the following reaction scheme.

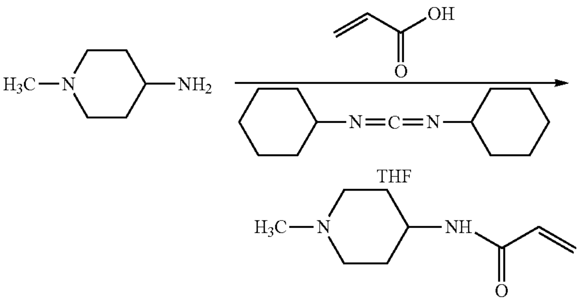

(M-2)

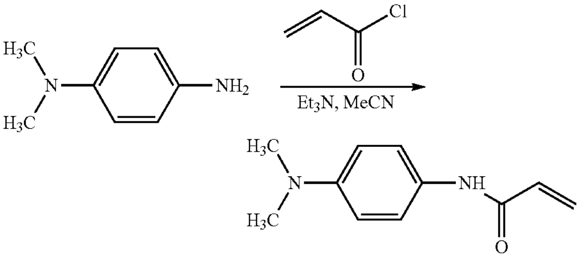

(M-3)

Monomer (M-2)

In a 300 mL three-necked flask, 23.8 g (208 mmol) of 4-amino-N-methylpiperazine and 238 mL of tetrahydrofuran are stirred under ice-cooling, and thereto, 11.69 g (208 mmol) of acrylic acid was added dropwise, and 11.69 g (208 mmol) of N,N-dicyclohexylcarbodiimide was further added thereto. The resultant mixture was stirred under ice-cooling for 30 minutes, and further stirred under room temperature for 8 hours. Produced white crystals were filtered off, and then filtrate was purified by silica gel column chromatography, and thus monomer (M-2) was obtained in an amount of 2.02 g (yield: 69%).

$^1$H-NMR (300 MHz, in $CDCl_3$)

δ=6.28 (dd, 1H, J=1.5, 17 Hz), 6.07 (dd, 1H, 10.2, 17 Hz), 5.64 (dd, 1H, J=1.5, 10.2 Hz), 5.48 (br.s, 1H), 3.8-3.95 (1H, m), 2.73-2.88 (m, 2H), 2.28 (s, 3H), 1.92-2.48 (m), 1.42-1.58 (m), 1.2-1.34 (m), 0.8-0.92 (m)

Monomer (M-3)

Into a 200 mL three-necked flask, 13.6 g (100 mmol) of N,N-dimethylamino-p-phenylenediamine, 136 mL of acetonitrile, and 14.6 mL (105 mmol) of triethylamine were put, the resultant mixture was stirred under ice-cooling, and thereto, 9.04 g (100 mmol) of acryloyl chloride was carefully added dropwise. After completion of the dropwise addition, the resultant mixture was further stirred for 30 minutes, and heated to room temperature and further stirred continuously for 2 hours. Then, 150 mL of water was added dropwise to the resultant reaction mixture under ice-cooling, crude crystals obtained were filtered, washed with water and an acetonitrile-water mixed solution, and thus objective monomer (M-3) was obtained in an amount of 7.94 g (yield: 42%).

$^1$H-NMR (300 MHz, in $CDCl_3$)

δ=7.43 (br.d, 2H, J=9.0 Hz), 7.37 (br.s, 1H), 6.69 (br.d, 2H, J=9.0 Hz), 6.39 (dd, 1H, J=1.5, 16.5 Hz), 6.23 (dd, 1H, J=10.2, 16.5 Hz), 5.69 (dd, 1H, J=1.5, 10.2 Hz), 2.92 (s, 6H)

Monomer (M-9)

The monomer (M-9) was synthesized, in accordance with the following reaction scheme.

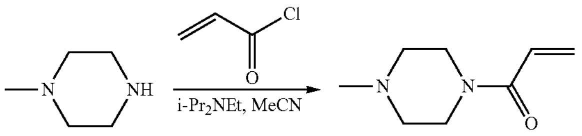

(M-9)

Into a 500 mL three-necked flask, 13.6 g (100 mmol) of N-methylpiperazine (product number: M0553, Tokyo Chemical Industry Co., Ltd.), 136 mL of acetonitrile, and 14.6 mL (105 mmol) of triethylamine (product number: 209-02656, Wako Pure Chemical Industries, Ltd.) were put, the resultant mixture was stirred under ice-water cooling, and thereto, 9.04 g (100 mmol) of acryloyl chloride (product number: A0147, Tokyo Chemical Industry Co., Ltd.) was carefully added dropwise. After completion of the dropwise addition, the resultant mixture was further stirred for 30 minutes, heated to room temperature, and further stirred continuously for 2 hours. Produced inorganic salts were filtered off and filtrate was concentrated. Water and methylene chloride were added to the residue obtained, and an aqueous layer was extracted 3 times. A collected organic layer was dried over anhydrous magnesium sulfate, concentrated by a rotary evaporator, purified by silica gel column chromatography, and thus objective monomer (M-9) was obtained in an amount of 6.3 g (yield: 20%).

$^1$H-NMR (300 MHz, in $CDCl_3$)

δ=6.56 (dd, 1H, J=10.5, 16.8 Hz), 6.28 (dd, 1H, J=1.8, 16.8 Hz), 5.69 (dd, 1H, J=1.8, 10.5 Hz), 3.53-3.75 (m, 4H), 2.42 (br.t, 4H, J=5.1 Hz), 2.32 (s, 3H)

Synthesis Example

<Synthesis of Polymers (P-1) and (P-2)>

The polymers (P-1) and (P-2) were synthesized, in accordance with the following reaction scheme.

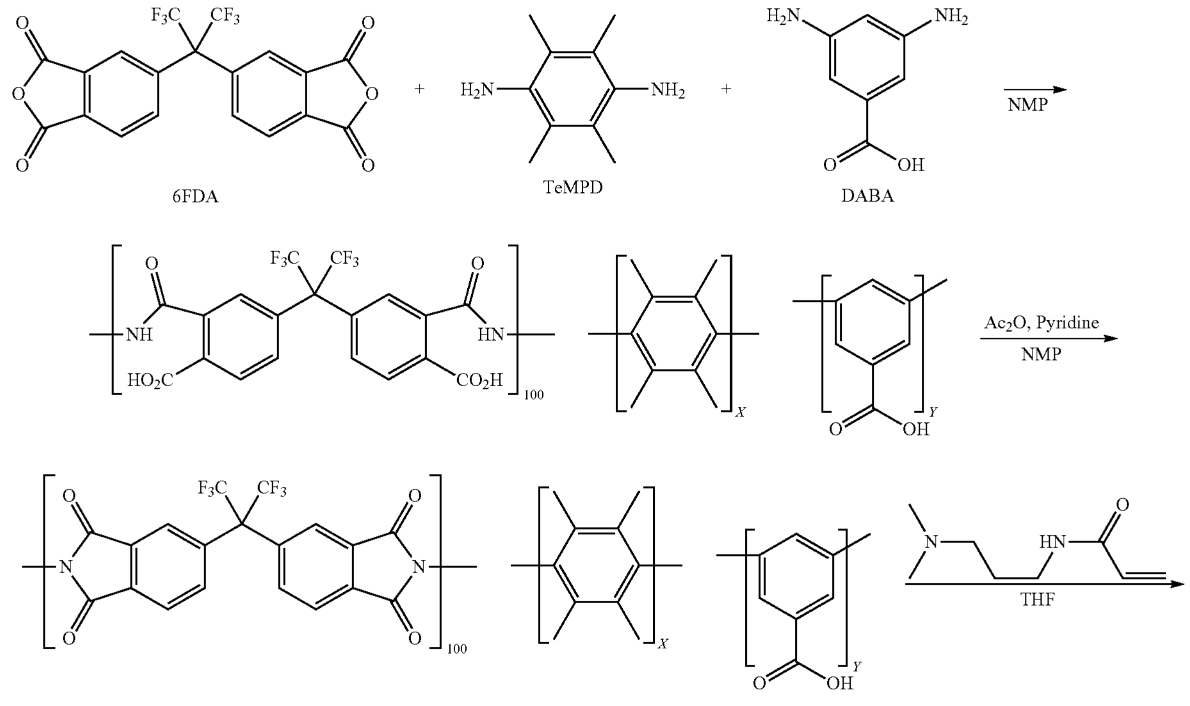

P-1 (X = 60 Y = 40)

-continued

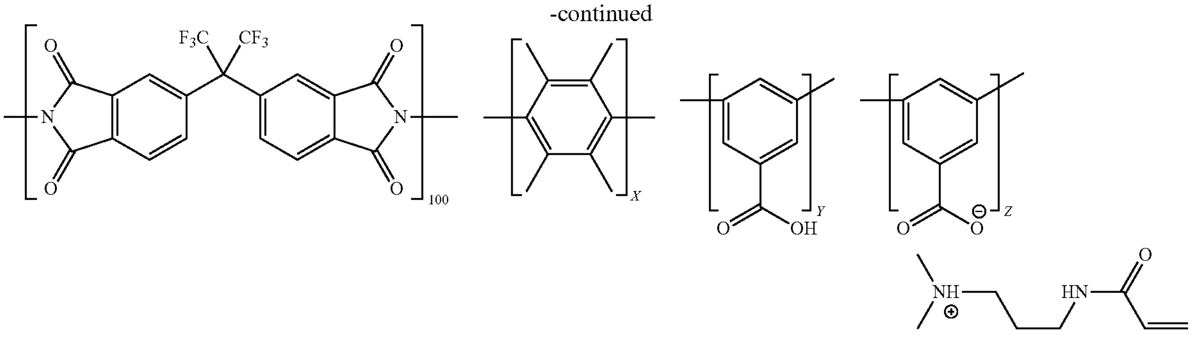

P-2 ($X$ = 60 $Y$ = 30 $Z$ = 10)

Synthesis of Polymer (P-1)

Into a 1 L three-necked flask, 123 mL of N-methylpyrrolidone and 54.97 g (0.124 mol) of 6FDA (product number: H0771, manufactured by Tokyo Chemical Industry Co., Ltd.) were put to allow dissolution at 40° C., the resultant mixture was stirred under a nitrogen flow, and thereto, 84.0 mL of N-methylpyrrolidone solution containing 8.13 g (0.049 mol) of 2,3,5,6-tetramethylphenylenediamine (product number: T1457, manufactured by Tokyo Chemical Industry Co., Ltd.) and 1.887 g (0.012 mol) of 3,5-diaminobenzoic acid (product number: D0294, manufactured by Tokyo Chemical Industry Co., Ltd.) was added dropwise thereto over 30 minutes while keeping an inside of a system at 40° C. The resultant reaction mixture was stirred at 40° C. for 2.5 hours, and then 2.94 g (0.037 mol) of pyridine and 31.58 g (0.31 mol) of acetic anhydride were added thereto, respectively, and the resultant mixture was stirred at 80° C. for 3 hours. Then, 676.6 mL of acetone was added to the reaction mixture, and the reaction mixture was diluted. Into a 5 L stainless steel container, 1.15 L of methanol and 230 mL of acetone were put, the resultant mixture was stirred, and thereto, the acetone diluted solution of the reaction mixture was added dropwise. An obtained polymer was subjected to suction filtration, and air blow drying at 60° C., and thus 60.1 g of polymer (P-1) was obtained.

Synthesis of Polymer (P-2)

Into 300 mL three-necked flask, 8.19 g of the polymer P-1 and 200 mL of tetrahydrofuran were put, the resultant mixture was stirred under room temperature, and thereto, 0.225 g (1.44 mmol) of N,N-dimethylaminopropyl acrylamide (product number: 041-20255, manufactured by Wako Pure Chemical Industries, Ltd.), and the resultant mixture was further stirred for 2 hours. Into a 5 L stainless steel container, 1.5 L of ethyl acetate was put and stirred, and thereto, the tetrahydrofuran solution of the reaction mixture was added dropwise. An obtained polymer was subjected to suction filtration, and air blow drying at 60° C., and thus 6.5 g of polymer (P-2) was obtained.

Polymers (P-4), (P-6), (P-7), (P-8), (P-11), (P-12), (P-16), (P-17), (P-19), (P-23), (P-24) and (P-25) were synthesized in a similar manner.

Example 1

In a 30 mL brown vial, 1.4 g of the polymer (P-1), 0.038 g of a crosslinking agent (M-1, product number: 041-20255, manufactured by Wako Pure Chemical Industries, Ltd.), and 8.6 g of methyl ethyl ketone were mixed, the resultant mixture was stirred for 30 minutes, 1.4 mg of 1-hydroxycyclohexyl phenyl ketone (product number: 40,561-2, manufactured by Sigma-Aldrich Corporation) was further added thereto, and the resultant mixture was stirred for 30 minutes. On a 10 cm square clean glass plate, a polyacrylonitrile porous membrane (manufactured by GMT Membrantechnik GmbH) was left to stand, the polymer liquid was cast on a surface of the porous support membrane, and the resultant material was immediately exposed at 10 mW for 60 seconds using light curing apparatus (TCT1000B-28HE) manufactured by Sen Lights Corporation, and thus a composite membrane sample No. 101 having a hardened film was obtained. The thickness of polymer (P-1) layer was about 1.3 μm, and the thickness of the polyacrylonitrile porous membrane, including a nonwoven fabric, was about 180 μm.

In a 30 mL brown vial, 1.4 g of the polymer (P-2) and 8.6 g of tetrahydrofuran were mixed, the resultant mixture was stirred for 30 minutes, and then 1.4 mg of 1-hydroxycyclohexyl phenyl ketone (product number: 40,561-2, manufactured by Sigma-Aldrich Corporation) were further added thereto, and the resultant mixture was further stirred for 30 minutes. On a 10 cm square clean glass plate, a polyacrylonitrile porous membrane (manufactured by GMT Membrantechnik GmbH) was left to stand, the polymer liquid was cast on a surface of the porous support membrane using an applicator, and the resultant material was immediately exposed at 10 mW for 60 seconds using light curing apparatus (TCT1000B-28HE) manufactured by Sen Lights Corporation, and thus a composite membrane sample No. 102 having a hardened film was obtained. The thickness of polymer (P-2) layer was about 1 μm, and the thickness of the polyacrylonitrile porous membrane, including a nonwoven fabric, was about 180 μm.

In a 30 mL brown vial, 1.4 g of the polymer (P-2) and 8.6 g of tetrahydrofuran were mixed, the resultant mixture was stirred for 30 minutes, and then 1.4 mg of V-65 (product number: 011-11082, manufactured by Wako Pure Chemical Industries, Ltd.) were further added thereto, and the resultant mixture was further stirred for 30 minutes. On a 10 cm square clean glass plate, a polyacrylonitrile porous membrane (manufactured by GMT Membrantechnik GmbH) was left to stand, the polymer liquid was cast on a surface of the porous support membrane using an applicator. The membrane obtained was left to stand at room temperature for 1 hour, heated at 70° C. for 2 hours, and thus a composite membrane sample No. 103 having a hardened film was obtained. The thickness of polymer (P-2) layer was about 1.8 μm, and the thickness of the polyacrylonitrile porous membrane, including a nonwoven fabric, was about 180 μm.

Composite membrane sample Nos. 104 and 105 were produced in a manner similar to the production of the composite membrane No. 102 except that the polyacrylonitrile porous membrane was changed to a polysulfone porous membrane or a polyphenylene oxide porous membrane. In the composite membrane No. 105, (P-4) was used as the polymer. Further, polymers, crosslinking agents and additives were changed as shown in Table 2 below, and polymer liquids each were coated on a polyacrylonitrile porous membrane, and thus composite membranes were produced (sample Nos. 106 to 119).

Herein, with regard to the cutoff molecular weight of any of these polyacrylonitrile porous membrane, polysulfone porous membrane and polyphenylene oxide porous membrane, a membrane having 100,000 or less was used.

In a 30 mL brown vial, 1.4 g of the polymer (P-19) and 8.6 g of tetrahydrofuran were mixed, the resultant mixture was stirred for 30 minutes, and then 20 mol % of diethyleneglycol divinyl ether (R-31) (product number: 139548, manufactured by Sigma-Aldrich Corporation) (the above-described exemplified compound M-6) and 2 mg of tri-p-tolylsulfonium hexafluorophosphate (product number: T2041, hereinafter referred to as "$Tolt_3SPF_6$", manufactured by Tokyo Chemical Industry Co., Ltd.) were further added thereto, and the resultant mixture was further stirred for 30 minutes. On a 10 cm square clean glass plate, a polyacrylonitrile porous membrane (manufactured by GMT Membrantechnik GmbH) was left to stand, the polymer liquid was cast on a surface of the porous support membrane using an applicator, and the resultant material was immediately exposed at 10 mW for 60 seconds using light curing apparatus (TCT1000B-28HE) manufactured by Sen Lights Corporation, and thus a composite membrane sample No. 111 having a hardened film was obtained. The thickness of polymer (P-19) layer was about 1.5 μm, and the thickness of the polyacrylonitrile porous membrane, including a nonwoven fabric, was about 180 μm.

<Polymer Described in U.S. Pat. No. 7,247,191 B2>

Into a 1 L three-necked flask, 100 mL of N-methylpyrrolidone and 12.0 g (0.027 mol) of 6FDA (product number: H0771, manufactured by Tokyo Chemical Industry Co., Ltd.) were put to allow dissolution at 40° C., the resultant mixture was stirred under a nitrogen flow, and thereto, 65 mL of N-methylpyrrolidone solution containing 3.25 g (0.0216 mol) of 2,4-diaminomesitylene (product number: T1275, manufactured by Tokyo Chemical Industry Co., Ltd.) and 0.82 g (0.0054 mol) of 3,5-diaminobenzoic acid (product number: D0294, manufactured by Tokyo Chemical Industry Co., Ltd.) was added dropwise thereto over 30 minutes while keeping an inside of a system at 40° C. The resultant reaction mixture was stirred at 40° C. for 2.5 hours, and then 0.64 g (0.0081 mol) of pyridine and 6.89 g (0.068 mol) of acetic anhydride were added thereto, respectively, and the resultant mixture was stirred at 80° C. for 3 hours. Then, 150 mL of acetone was added to the reaction mixture, and the reaction mixture was diluted. Into a 5 L stainless steel container, 1.5 L of methanol was put and stirred, and thereto, the acetone diluted solution of the reaction mixture was added dropwise. The obtained polymer crystals were subjected to suction filtration, and air blow drying at 60° C., and thus 8.3 g of polymer (A) was obtained. To this polymer (A), propylene glycol was added in an amount equivalent to 3,5-diaminobenzoic acid, the polymer liquid was cast on each porous support membrane of polyacrylonitrile (PAN), polysulfone (Psf) and polyphenylene oxide (PPO) using an applicator in a manner similar to the operations for the sample No. 101, in a manner similar to the method described in U.S. Pat. No. 7,247,191 B2, and thus crosslinked composite membrane sample Nos. c11, c12 and c13 were produced.

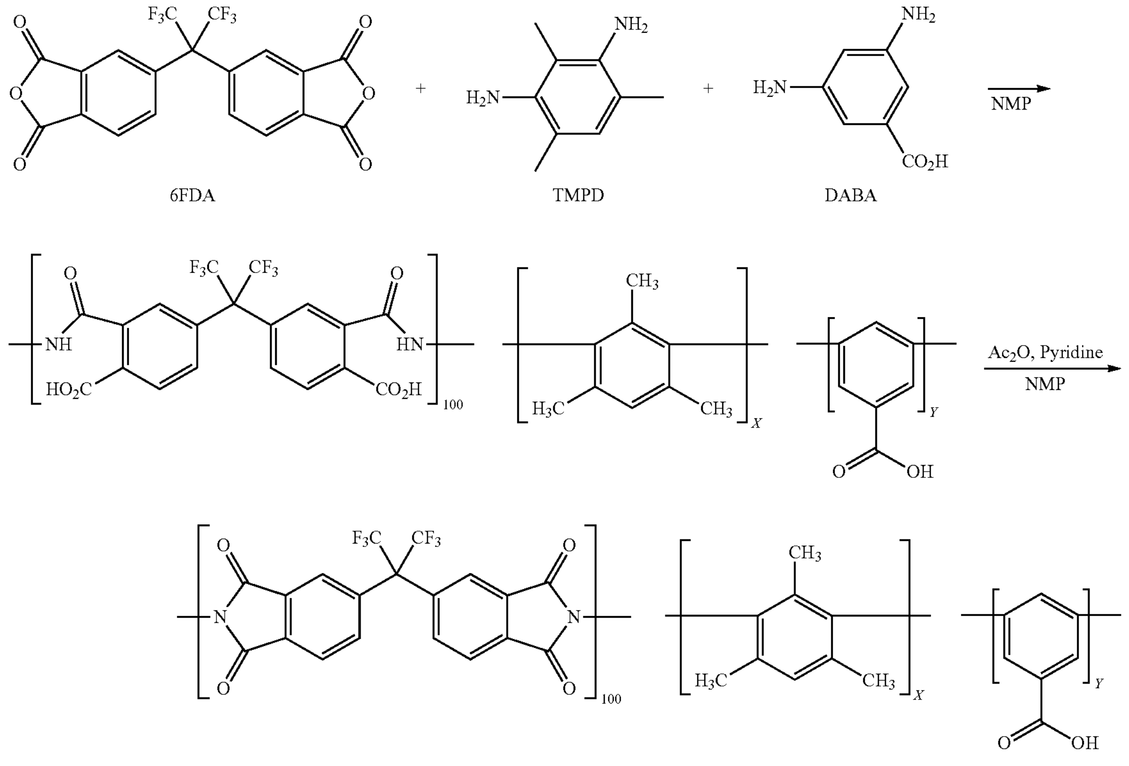

$X = 60$ $Y = 40$

Polymer described in U.S. Pat. No. 7,247,191B2

With reference to European Polymer Journal, Vol. 33, No. 10-12, 1717-1721 (1997), a photo-curable crosslinkable polyimide-polyphenylene oxide (PPO) composite membrane sample No. c14 was produced.

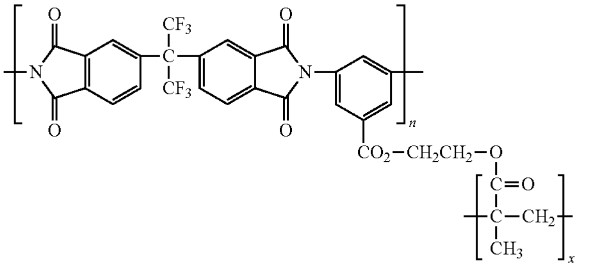

Polymer described in European Polymer Journal, 33, 1717(1997)

(Measurement of Gas Permeability)

With regard to a gas separation composite membrane of each membrane sample obtained, a gas permeability measuring device (GTR-10XF, manufactured by GTR Tec Corporation) was used, a mixed gas (1:1) of carbon dioxide ($CO_2$) and methane ($CH_4$) was used, and each gas permeability for $CO_2$ and $CH_4$ was measured at 40° C. by adjusting pressure on a side of gas supply to 8 atmospheric pressure. The gas permeability of a membrane was compared by calculating gas transmission rate as gas permeability (permeance). A unit of the gas permeability (gas transmission rate) was expressed in terms of a GPU unit [1 GPU=$1\times10^{-6}$ $cm^3$ (STP)/$cm^2$·sec·cmHg.].

Moreover, a ratio of transmission rates ($TR_{CO2}/TR_{CH4}$) from a transmission rate ($TR_{CO2}$) of carbon dioxide and a transmission rate ($TR_{CH4}$) of methane as obtained was determined.

(Bending Test [Membrane-Forming Competence Test])

The gas separation composite membrane according to the present invention is desirably used for a package referred to as a module or an element in which the membrane is packed. When the gas separation composite membrane is used for the module, the membranes are packed with high density in order to increase a membrane surface area, and therefore packed by bending the membranes in a spiral shape in a flat sheet membrane. Therefore, sufficient bending strength should be provided with the membrane. In order to confirm the performance, operations of bending each composite membrane at 180 degrees and unbending the membrane were repeated by 50 times, and then whether or not measurement of the gas permeability was allowed was confirmed.

A: Measurement of permeability was allowed without any problem.

B: Measurement of permeability was not allowed.

Table 2 below shows results of the gas permeability (transmission rate), the ratio of transmission rates ($CO_2/CH_4$ selectivity in Table 2 below) and the bending test.

In addition, the crosslinked site ratio [η] was from about 0.0001 to 0.45 for all of the samples according to the present invention, about 0.2 for all of the comparative sample Nos. c11 to c13, and about 0.5 for the comparative sample No. c14. The crosslinkable functional group density [γ] was 0.1 or less for all of the samples according to the present invention, from 0.6 to 0.7 for all of the comparative sample Nos. c11 to c13, and 0.9 or more for the comparative sample No. c14. The crosslinking conversion ratio [α] was from 60 to 100 for all of the samples according to the present invention, and 90 or more for all of the comparative samples.

Here, the sample Nos. 101 to 119 each are an example according to the present invention, and the sample Nos. c11 to c14 each are Comparative Example.

In the table, a typical one of a polar group in the present invention was presented.

TABLE 2

| Sample No. | Supporting membrane | Polymer | Crosslinking agent | Crosslinked structure *1 | Crosslinking temperature/Time |
|---|---|---|---|---|---|
| 101 | PAN | P-1 | M-1 | A, F | R.T./1 min |
| 102 | PAN | P-2 | None | A, F | R.T./1 min |
| 103 | PAN | P-2 | None | A, F | 70° C./120 min |
| 104 | PSf | P-2 | None | A, F | R.T./1 min |
| 105 | PPO | P-4 | None | A, F | R.T./1 min |
| 106 | PAN | P-6 | None | G | R.T./1 min |
| 107 | PAN | P-7 | M-5 | G | R.T./1 min |
| 108 | PAN | P-8 | None | G | R.T./1 min |
| 109 | PAN | P-11 | None | A, F | R.T./1 min |
| 110 | PAN | P-12 | None | A, F | R.T./1 min |
| 111 | PAN | P-19 | M-6 (R-31) | C | R.T./1 min |
| 112 | PAN | P-16 | None | A | R.T./1 min |
| 113 | PAN | P-17 | None | A | R.T./1 min |
| 114 | PAN | P-23 | None | A, F | R.T./1 min |
| 115 | PAN | P-24 | None | A, E | R.T./1 min |
| 116 | PAN | P-25 | None | A, F | R.T./1 min |
| 117 | PAN | P-1 | M-2 | A, F | R.T./1 min |
| 118 | PAN | P-1 | M-3 | A, F | R.T./1 min |
| 119 | PAN | P-1 | M-9 | F | R.T./1 min |
| c11 | PAN | — | — | cA | 150° C./25 h |
| c12 | PSf | — | — | cA | 150° C./25 h |
| c13 | PPO | — | — | cA | 150° C./25 h |
| c14 | PPO | — | — | cA | 80° C./60 min<br>150° C./60 min<br>165° C./30 min<br>190° C./10 min |

| Sample No. | $CO_2$ permeability (GPU) | $CO_2/CH_4$ separation selectivity | Bending test (Membrane-forming competence) |
|---|---|---|---|
| 101 | 69 | 39 | A |
| 102 | 71 | 38 | A |
| 103 | 71 | 37 | A |
| 104 | 70 | 39 | A |
| 105 | 66 | 43 | A |
| 106 | 71 | 38 | A |
| 107 | 53 | 34 | A |
| 108 | 57 | 34 | A |
| 109 | 65 | 38 | A |
| 110 | 53 | 34 | A |
| 111 | 46 | 30 | A |
| 112 | 50 | 30 | A |
| 113 | 49 | 30 | A |
| 114 | 60 | 34 | A |
| 115 | 48 | 30 | A |
| 116 | 49 | 30 | A |
| 117 | 67 | 36 | A |
| 118 | 66 | 37 | A |
| 119 | 69 | 35 | A |
| c11 | The membrane was broken | — | B |
| c12 | The membrane was broken | — | B |
| c13 | 20 | 18 | B |
| c14 | 11 | 21 | B |

*1 The structure only needs to be included in the crosslinking chain.

R.T.: room temperature

Abbreviations in the above-described Table 2 are as described below.

PAN: Polyacrylonitrile

PSf: Polysulfone

PPO: Polyphenyleneoxide

Room temperature: about 25° C.

Radical: Radical crosslinking

Ester: Transesterification

<Crosslinked Structure>

A: —$NR^aC$(═O)—

B: —$NR^bC$(═O)O—

C: —$CH_7OCH_2$—

D: —$CH_2SCH_2$—

E: —OC(═O)O—

F: —C(═O)$O^-N^+(R^c)_3$—

G: —$SO_3^-N^+(R^d)_3$—

I: —$PO_3^-N^+(R^c)_3$— cA: —C(═O)O—La—OC(═O)— (La: an alkylene group)

Herein, $R^a$, $R^b$, $R^c$, $R^d$ and $R^e$ each represent a hydrogen atom or a substituent.

The above-described results show that the gas separation composite membrane according to the present invention is excellent in both carbon dioxide permeability and separation selectivity, and also is provided with high bending strength.

Example 2

A sample error ratio was evaluated using the gas separation membrane of each sample produced in Example 1.

(Sample Error Ratio)

Were produced 50 samples of each of the gas separation composite membranes described above, permeability of hydrogen of each sample was measured, the sample having a gas permeance higher than 1,000,000 GPU ($1\times10^6$ $cm^3/cm^2\cdot sec\cdot cmHg$) was defined as a membrane having pinholes, and a value obtained by the following equation was calculated as a sample error ratio.

Sample error ratio=(The number of membranes having pinholes/50)×100

The obtained results are shown in Table 3.

TABLE 3

| Sample No. | Sample error ratio [%] |
|---|---|
| 101 | 6 |
| 102 | 4 |
| 103 | 12 |
| 104 | 6 |
| 105 | 8 |
| 106 | 6 |
| 107 | 8 |
| 108 | 4 |
| 109 | 6 |
| 110 | 4 |
| 111 | 6 |
| 112 | 4 |
| 113 | 8 |
| 114 | 4 |
| 115 | 4 |
| 116 | 4 |
| 117 | 6 |
| 118 | 4 |
| 119 | 4 |
| c11 | — |
| c12 | — |
| c13 | 46 |
| c14 | 66 |

From the above-described results, the number of pinholes is small for any of the gas separation composite membrane according to the present invention. Thus, the results show that a membrane having a good gas separating layer with few pinholes can be prepared according to the present invention.

Example 3

Each gas separation composite membrane produced in Example 1 was stored under conditions of 80° C. and 90% humidity (low-temperature thermo-hygrostat, Suisho, Isuzu Seisakusho Co., Ltd.) for 24 hours, a gas permeability test was conducted in a manner similar to the operations in Example 1, and $CO_2/CH_4$ separation selectivity [ratio of transmission rates ($TR_{CO2}/TR_{CH4}$)] after storage was investigated.

The results are shown in Table 4 below.

TABLE 4

| Sample No. | Separation selectivity | Separation selectivity (after wet heat test) |
|---|---|---|
| 101 | 35 | 30 |
| 102 | 34 | 28 |
| 103 | 32 | 26 |
| 104 | 31 | 27 |
| 105 | 33 | 25 |
| 106 | 38 | 32 |
| 107 | 32 | 26 |
| 108 | 33 | 27 |
| 110 | 35 | 29 |
| 111 | 36 | 31 |
| 112 | 34 | 30 |
| 113 | 30 | 25 |
| 114 | 35 | 30 |
| 115 | 34 | 29 |
| 116 | 31 | 27 |
| 117 | 33 | 29 |
| 118 | 34 | 30 |
| 119 | 32 | 28 |
| c13 | 18 | 3.6 |
| c14 | 21 | 1.8 |

As shown in Table 4, all gas separation composite membranes according to the present invention are found to have, even after storage under high humidity, 20 or more of ratios of transmission rates ($TR_{CO2}/TR_{CH4}$), and to be excellent in separation selectivity.

Thus, the gas separation composite membrane according to the present invention is found to be excellent in chemical stability, particularly, stability after wet heat treatment and to have a suppressed decrease of separation selectivity due to having specific crosslinked structure. Even in a case where moisture is mixed as an impurity even in a trace amount in an actual purification process of the natural gas, the gas separation composite membrane according to the present invention is expected to maintain high separation performance On synthesizing the above-described results, the gas separation composite membrane according to the present invention is found to have excellent gas permeability and gas separation selectivity, and particularly, to be excellent in permeability of carbon dioxide, and excellent as the separation membrane of carbon dioxide/methane. Further, the present invention allows preparation of a strong composite membrane at a low temperature and in a short time, and therefore the gas separation composite membrane is excellent in production competence. Furthermore, the gas separation composite membrane is excellent in stability after wet heat treatment to develop stable performance over a long period. The gas separation composite membrane of the present invention allows provision of an excellent gas separation method, gas separation membrane module, gas separation method using the gas separation membrane module and gas separation apparatus.

Having described our invention as related to the present embodiments, it is our intention that the invention not be limited by any of the details of the description, unless otherwise specified, but rather be construed broadly within its spirit and scope as set out in the accompanying claims.

This non-provisional application claims priority under 35 U.S.C. §119 (a) on Patent Application No. 2011-165889 filed in Japan on Jul. 28, 2011, which is entirely herein incorporated by reference.

Reference Signs List

1 Gas separating layer

2 Porous layer

3 Nonwoven fabric layer

10 and 20 Gas separation composite membrane

The invention claimed is:

1. A gas separation composite membrane, comprising:

a gas-permeable supporting layer; and a gas separating layer containing a crosslinked polyimide resin over the gas-permeable supporting layer, wherein the crosslinked polyimide resin has structure in which a polyimide compound is crosslinked through a specific crosslinking chain;

wherein the specific crosslinking chain has at least one kind of linking group selected from the group consisting of —$NR^aC(=O)$—, —$NR^bC(=O)O$—, —$CH_2OCH_2$—, —$CH_2SCH_2$—, —$OC(=O)O$—, —$C(=O)O^-N^+(R^c)_3$—, —$SO_3^-N^+(R^d)_3$— and —$PO_3^-N^+(R^e)_3$—;

wherein $R^a$, $R^b$, $R^c$, $R^d$ and $R^e$ each independently represent a hydrogen atom or a substituent; and a plurality of $R^a$, $R^b$, $R^c$, $R^d$ and $R^e$ may be identical or different, or may be bonded or subjected to ring condensation with each other to form a ring; and wherein the polyimide compound contains a repeating unit represented by Formula (I), at least one kind of repeating unit represented by Formula (II-a) or (II-b), and at least one kind of repeating unit represented by Formula (III-a) or (III-b):

Formula (I)

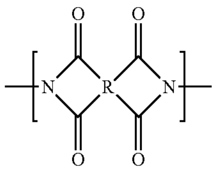

wherein R in Formula (I) is a group of atoms selected from the group consisting of the groups represented by any one of Formulas (I-a) to (I-g);

Formula (I-a)

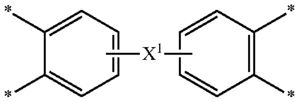

Formula (I-b)

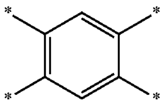

Formula (I-c)

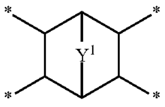

-continued

Formula (I-d)

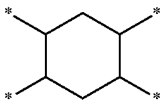

Formula (I-e)

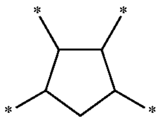

Formula (I-f)

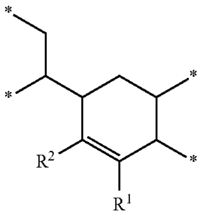

Formula (I-g)

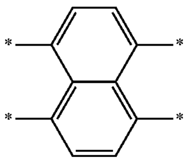

wherein, in Formulas (I-a) to (I-g), $X^1$ represents a single bond or a bivalent linking group; $Y^1$ represents a methylene group or a vinylene group; $R^1$ and $R^2$ each independently represent a hydrogen atom or a substituent, or may bond with each other to form a ring; and the symbol "*" represents a binding site with the carbonyl group of the imide in Formula (I);

Formula (II-a)

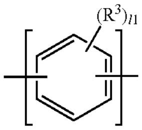

Formula (II-b)

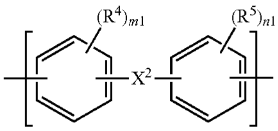

wherein $R^3$ in Formula (II-a) represents an alkyl group, a hydroxyl group, a carboxyl group, a sulfonic acid group, an amino group or a halogen atom; 11 in Formula (II-a) represents an integer of from 0 to 4; $R^4$ and $R^5$ in Formula (II-b) each independently represent an alkyl group, a hydroxyl group, a carboxyl group, a sulfonic acid group, an amino group or a halogen atom; $R^4$ and $R^5$ in Formula (II-b) may bond with each other to form a ring; m1 and n1 in Formula (II-b) each independently represent an integer of from 0 to 4; and $X^2$ in Formula (II-b) represents a single bond or a bivalent linking group; and Formula (III-a)

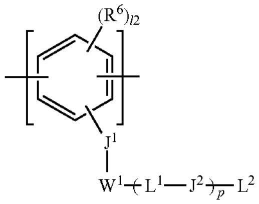

Formula (III-b)

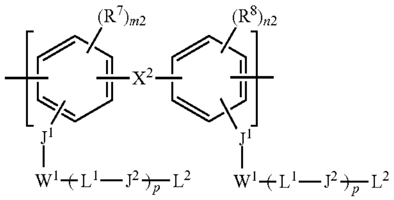

wherein, in Formulas (III-a) and (III-b), $R^6$, $R^7$ and $R^8$ each independently represent a substituent; $R^7$ and $R^8$ may bond with each other to form a ring; $J^1$ and $J^2$ each independently represent at least one kind of linking group selected from the group consisting of —$CH_2SCH_2$—, —OC(═O)O —, —C(═O)$O^-N^+(R^c)_3$—, —$SO_3^-N^+(R^d)_3$—, and —$PO_3^-N^+(R^e)_3$—; $R^c$, $R^d$ and $R^e$ each independently represent a hydrogen atom or a substituent; $W^1$ represents a single bond or a bivalent linking group; 12, m2 and n2 each independently represent an integer of from 0 to 3; $L^1$ represents a bivalent linking group; $L^2$ represents a functional group; p represents an integer of 0 or more; when p is 2 or more, $L^1$'s and $J^2$'s may be the same or different from each other; and $X^3$ represents a single bond or a bivalent linking group.

2. The gas separation composite membrane according to claim 1, wherein $R^a$, $R^b$, $R^c$, $R^d$ and $R^e$ each independently represent a hydrogen atom or an alkyl group having 1 to 10 carbon atoms.

3. The gas separation composite membrane according to claim 1, wherein the specific crosslinking chain contains at least one kind of linking group selected from the group consisting of —C(═O)$O^-N^+(R^c)_3$— and —$SO_3^-N^+(R^d)_3$—, and —NHC(═O)—.

4. The gas separation composite membrane according to claim 1, wherein $X^1$ represents a single bond, —$C(Ra)_2$—, —O—, —$SO_2$—, —C(═O)—, or —S—; and Ra represents a hydrogen atom or an alkyl group.

5. The gas separation composite membrane according to claim 1, wherein $R^1$ and $R^2$ each independently represent a hydrogen atom, an alkyl group, a cycloalkyl group, an alkenyl group, an alkynyl group, an aryl group, an amino group, an alkoxy group, an aryloxy group, a heterocyclic oxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a sulfamoyl group, a carbamoyl group, an alkylthio group, an arylthio group, a heterocyclic thio group, a sulfonyl group, a sulfinyl group, a ureido group, a phosphoric acid amide group, a hydroxyl group, a mercapto group, a halogen atom, a cyano group, a sulfo group, a carboxyl group, an oxo group, a nitro group, a hydroxamic acid group, a sulfino group, a hydrazino group, an imino group, a heterocyclic group, a silyl group, or a silyloxy group.

6. The gas separation composite membrane according to claim 1, wherein $X^2$ represents a single bond, —$C(Ra)_2$—, —O—, —$SO_2$—, —C(═O)—, or —S—; and Ra represents a hydrogen atom or an alkyl group.

7. The gas separation composite membrane according to claim 1, wherein $R^6$, $R^7$ and $R^8$ in Formulas (III-a) and (III-b) each independently represent an alkyl group, a cycloalkyl group, an alkenyl group, an alkynyl group, an aryl group, an amino group, an alkoxy group, an aryloxy group, a heterocyclic oxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a sulfamoyl group, a carbamoyl group, an alkylthio group, an arylthio group, a heterocyclic thio group, a sulfonyl group, a sulfinyl group, a ureido group, a phosphoric acid amide group, a hydroxyl group, a mercapto group, a halogen atom, a cyano group, a sulfo group, a carboxyl group, an oxo group, a nitro group, a hydroxamic acid group, a sulfino group, a hydrazino group, an imino group, a heterocyclic group, a silyl group, or a silyloxy group.

8. The gas separation composite membrane according to claim 1, wherein $W^1$ in Formulas (III-a) and (III-b) represents a single bond, an alkylene group, an alkyleneoxy group, an aralkylene group, or an arylene group.

9. The gas separation composite membrane according to claim 1, wherein $L^1$ in Formulas (III-a) and (III-b) represents any one of Formulas (L-1) to (L-35) described below, an alkylene group, an alkyleneoxy group or an arylene group

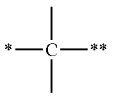

(L-1)

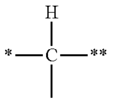

(L-2)

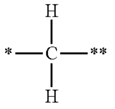

(L-3)

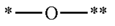

(L-4)

(L-5)

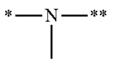

(L-6)

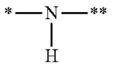

(L-7)

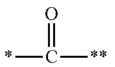

(L-8)

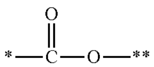

(L-9)

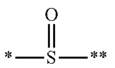

(L-10)

-continued (L-11)

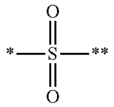

(L-12)

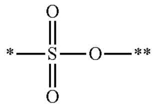

(L-13)

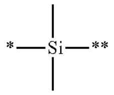

(L-14)

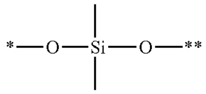

(L-15)

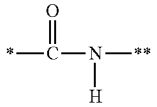

(L-16)

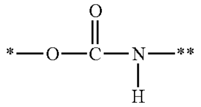

(L-17)

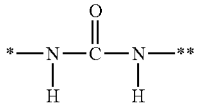

(L-18)

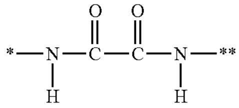

(L-19)

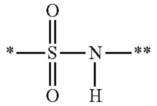

(L-20)

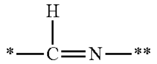

(L-21)

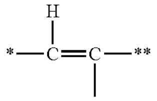

(L-22)

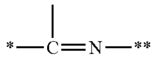

(L-23)

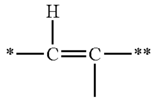

(L-24)

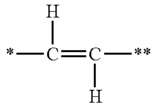

-continued (L-25)

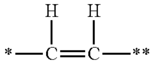

(L-26)

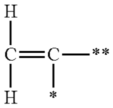

(L-27)

(L-28)

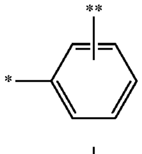

(L-29)

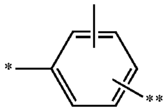

(L-30)

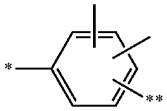

(L-31)

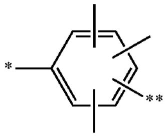

(L-32)

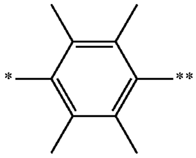

(L-33)

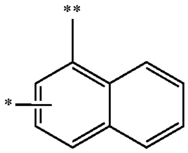

(L-34)

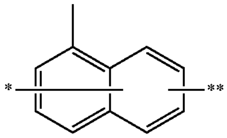

(L-35)

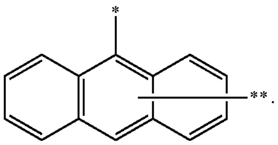

10. The gas separation composite membrane according to claim 1, wherein the functional group is at least one kind of functional group selected from the group consisting of —NHC(=O)CR$^f$=CH$_2$, —OH, —SH, and —CH=CH$_2$; and R$^f$ represent a hydrogen atom or an alkyl group.

11. The gas separation composite membrane according to claim 1, wherein X$^3$ represents a single bond, —C(Ra)$_2$—, —O—, —$SO_2$—, —C(═O)—, or —S—; and Ra represents a hydrogen atom or an alkyl group.

12. The gas separation composite membrane according to claim 1, wherein R in formula (I) is represented by formula (I-a')

Formula (I-a')

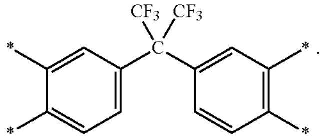

13. The gas separation composite membrane according to claim 1, wherein $J^1$ in formulas (III-a) and (III-b) is at least one kind of linking group selected from the group consisting of —C(═O)$O^-N^+R^c_3$—, —$SO_3^-N^+R^d_3$—, and —$PO_3^-N^+R^e_3$—.

14. The gas separation composite membrane according to claim 1, wherein p in formulas (III-a) and (III-b) is 0.

15. The gas separation composite membrane according to claim 1, wherein $L^2$ in formulas (III-a) and (III-b) is —NHC(═O)$CR^f$═$CH_2$, and $R^f$ represent a hydrogen atom or an alkyl group.

16. The gas separation composite membrane according to claim 1, wherein the supporting layer contains a porous layer on a side of the gas separating layer and a nonwoven fabric layer on a side reverse thereto.

17. The gas separation composite membrane according to claim 16, wherein the porous layer has a molecular weight cut-off of 100,000 or less.

18. The gas separation composite membrane according to claim 1, wherein a gas to be supplied is a mixed gas of at least carbon dioxide and methane, wherein a transmission rate of the carbon dioxide at 40° C. and 8 atmospheric pressure is more than 20 GPU, and wherein a ratio of the transmission rate of the carbon dioxide to a transmission rate of the methane ($TR_{CO2}/TR_{CH4}$) is 20 or more.

19. A gas separation module, comprising the gas separation composite according to claim 1.

20. A gas separation apparatus, comprising the gas separation module according to claim 19.

21. A gas separation method, which comprises a step of selectively permeating carbon dioxide from a gas containing carbon dioxide and methane by using the gas separation composite membrane according to claim 1.

22. The gas separation composite membrane according to claim 1, wherein the linking group is —C(═O)$O^-N^+(R^c)_3$—.

* * * * *